(12) United States Patent
Kaji

(10) Patent No.: US 10,179,482 B2
(45) Date of Patent: Jan. 15, 2019

(54) PNEUMATIC TIRE

(71) Applicant: BRIDGESTONE CORPORATION, Chuo-ku, Tokyo (JP)

(72) Inventor: Yoshio Kaji, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 432 days.

(21) Appl. No.: 14/355,068

(22) PCT Filed: Oct. 31, 2012

(86) PCT No.: PCT/JP2012/006999
§ 371 (c)(1),
(2) Date: Apr. 29, 2014

(87) PCT Pub. No.: WO2013/065304
PCT Pub. Date: May 10, 2013

(65) Prior Publication Data
US 2014/0299245 A1    Oct. 9, 2014

(30) Foreign Application Priority Data

Nov. 4, 2011 (JP) .................... 2011-242638
Nov. 11, 2011 (JP) .................... 2011-248104
Apr. 11, 2012 (JP) .................... 2012-090490

(51) Int. Cl.
*B60C 11/12* (2006.01)

(52) U.S. Cl.
CPC ... *B60C 11/1218* (2013.01); *B60C 2011/1213* (2013.01); *B60C 2011/1227* (2013.01)

(58) Field of Classification Search
CPC ......... B60C 11/1218; B60C 2011/1227; B60C 2011/1213
See application file for complete search history.

(56) References Cited

U.S. PATENT DOCUMENTS 4,298,046 A * 11/1981 Herbelleau ............. B60C 11/12
152/209.23
4,794,965 A * 1/1989 Lagnier ................... B60C 11/12
152/209.1
(Continued)

FOREIGN PATENT DOCUMENTS

CN          1623807 A     6/2005
JP          63-137003 A   6/1988
(Continued)

OTHER PUBLICATIONS

Machine translation for Japan 2005-119415 (no date).*
(Continued)

*Primary Examiner* — Steven D Maki
(74) *Attorney, Agent, or Firm* — Sughrue Mion, PLLC

(57) ABSTRACT

Provided is a pneumatic tire including a land portion provided with a sipe, which is capable of simultaneously providing snow performance, dry performance, and wet performance all at high level in a single land portion. The pneumatic tire includes a land portion 2 on a tread portion. The land portion 2 is provided with a sipe 5 having amplitude in a tire circumferential direction and extending in a tire width direction. In a depth direction extending from a land portion surface S toward an inner side in a tire radial direction, sipe 5 includes: a land portion's surface-side part $5a_1$ bent toward tire circumferential direction from land portion surface S; and a land portion's bottom-side part $5a_2$ bent in a direction different from a direction of land portion's surface-side part $5a_1$ or bent toward tire circumferential direction by a displacement different from a displacement of land portion's surface-side part $5a_1$.

11 Claims, 16 Drawing Sheets

(56) References Cited

U.S. PATENT DOCUMENTS

| | | | | |
|---|---|---|---|---|
| 6,427,737 | B1* | 8/2002 | Katayama | B60C 11/11 |
| | | | | 152/209.21 |
| 2002/0053383 | A1* | 5/2002 | Kleinhoff | B29C 33/301 |
| | | | | 152/209.18 |
| 2003/0029537 | A1* | 2/2003 | Iwamura | B60C 11/12 |
| | | | | 152/209.18 |
| 2006/0169377 | A1* | 8/2006 | Hashimoto | B60C 11/12 |
| | | | | 152/209.23 |
| 2011/0100519 | A1* | 5/2011 | Yamakawa | B60C 11/0302 |
| | | | | 152/209.18 |

FOREIGN PATENT DOCUMENTS

| | | | | |
|---|---|---|---|---|
| JP | 08-207514 | A | * | 8/1996 |
| JP | 10-24709 | A | | 1/1998 |
| JP | 10-181315 | A | * | 7/1998 |
| JP | 20006618 | A | | 1/2000 |
| JP | 2000177329 | A | | 6/2000 |
| JP | 200229227 | A | | 1/2002 |
| JP | 2004-314758 | A | * | 11/2004 |
| JP | 2004-314758 | A | | 11/2004 |
| JP | 2005-119415 | A | | 5/2005 |
| JP | 2005-119415 | A | * | 5/2005 |
| JP | 2005-193770 | A | * | 7/2005 |
| JP | 2006-096324 | A | | 4/2006 |
| JP | 2006-298055 | A | | 11/2006 |
| JP | 2006347255 | A | | 12/2006 |
| JP | 2008-049971 | A | | 3/2008 |
| WO | 2009/145019 | A1 | | 12/2009 |

OTHER PUBLICATIONS

Machine transaltion for Japan 2004-314758 (no date).*
Machine translation for Japan 10-181315 (no date).*
Machine transaltion for Japan 08-207514 (no date).*
Machine translation for Japan 2005-193770 (no date).*
Communication dated Nov. 10, 2015, issued by the Japan Patent Office in corresponding Japanese Application No. 2011-248104.
Communication dated Sep. 1, 2015 from the Japanese Patent Office issued in corresponding application No. 2012-090490.
Communication dated Jun. 18, 2015, issued by the Russian Patent Office in corresponding Russian Application No. 2014122530/11.
Communication dated Jun. 23, 2015 from the Japanese Patent Office in counterpart application No. 2011-248104.
Communication dated Jun. 16, 2015 from the European Patent Office in counterpart European Application No. 12846769.3.
International Search Report for PCT/JP2012/006999, dated Jan. 29, 2013.
Communication dated Dec. 1, 2015 from the State Intellectual Property Office of the P.R.C. in counterpart application No. 201280065990.6.

* cited by examiner

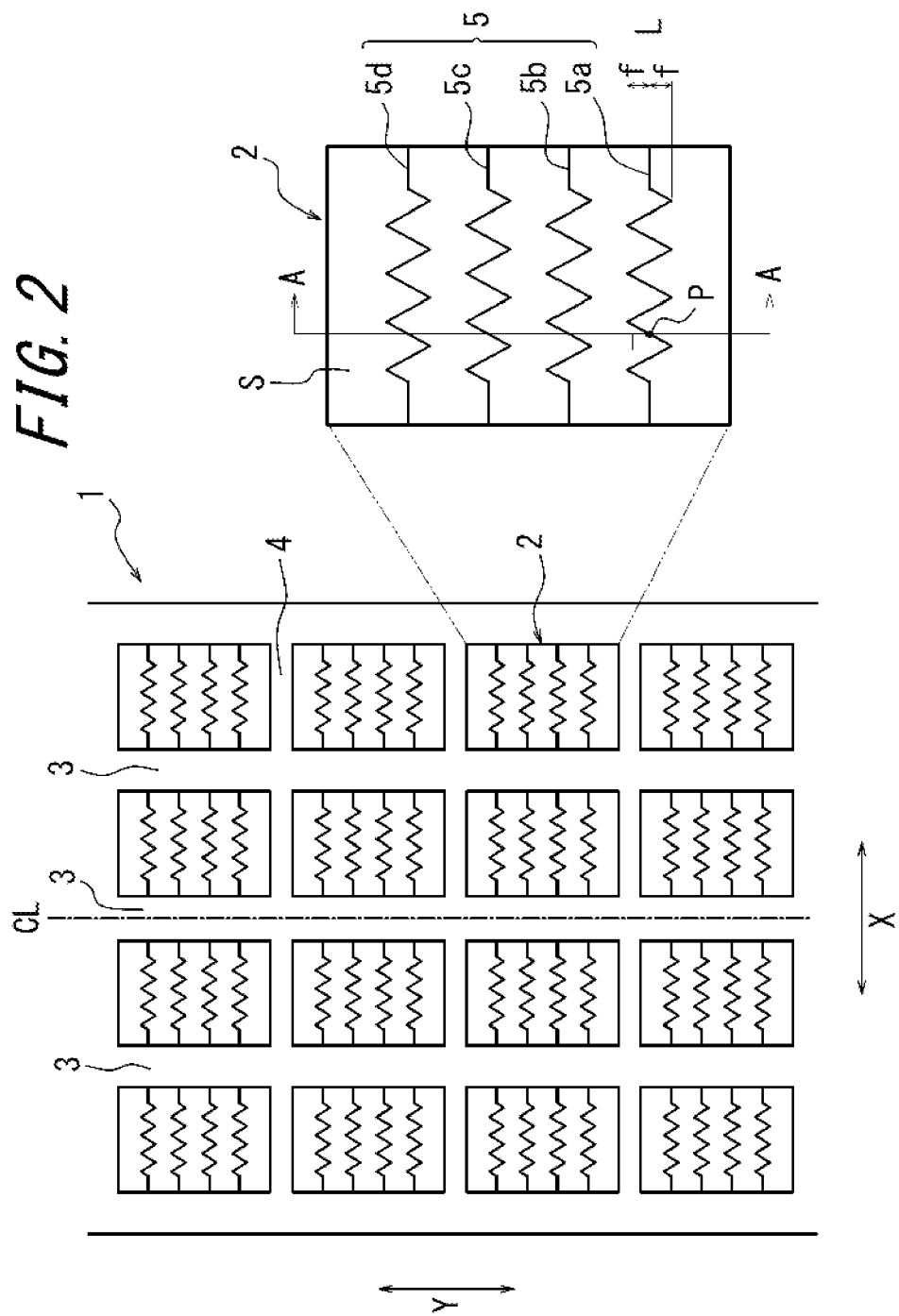

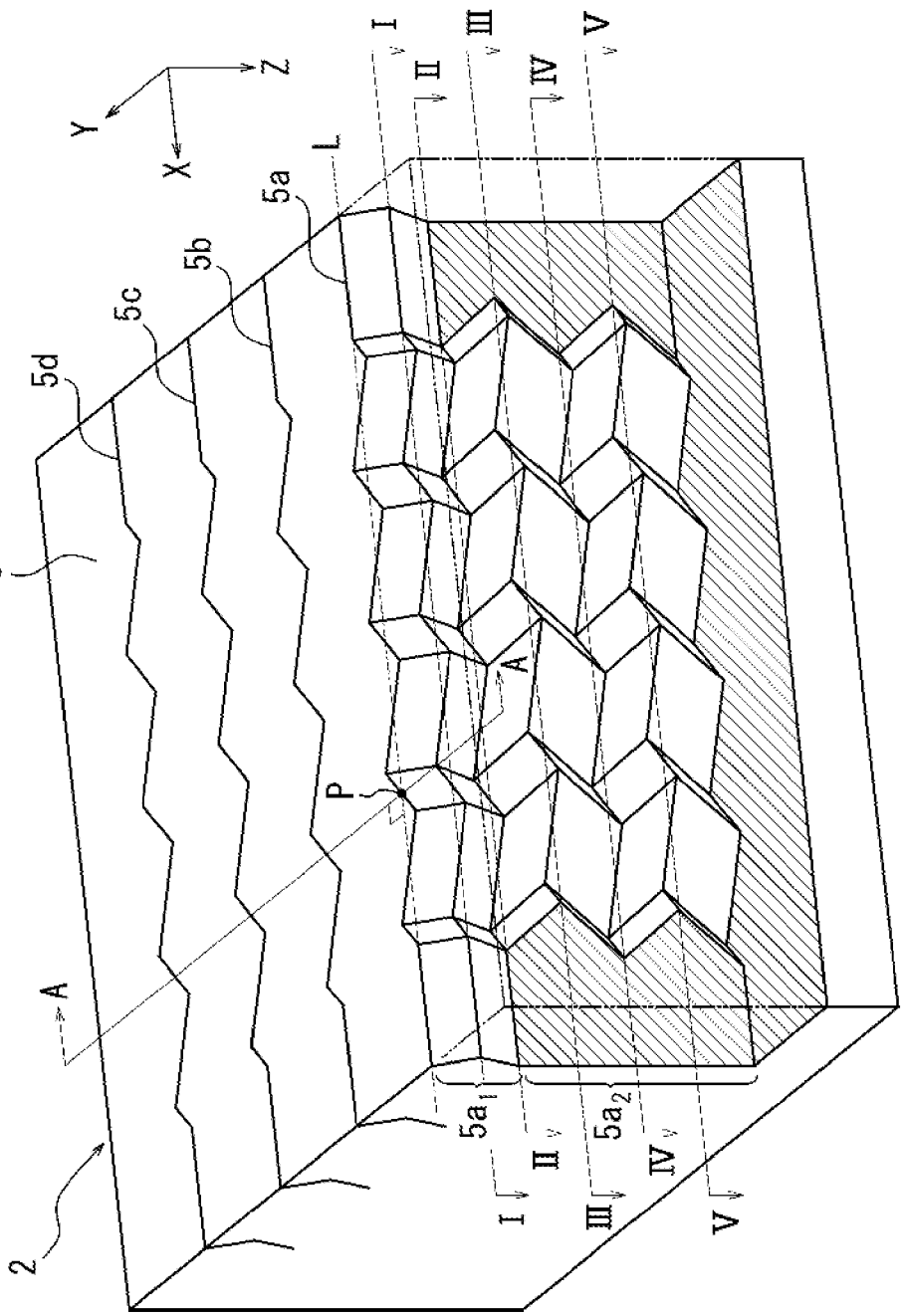

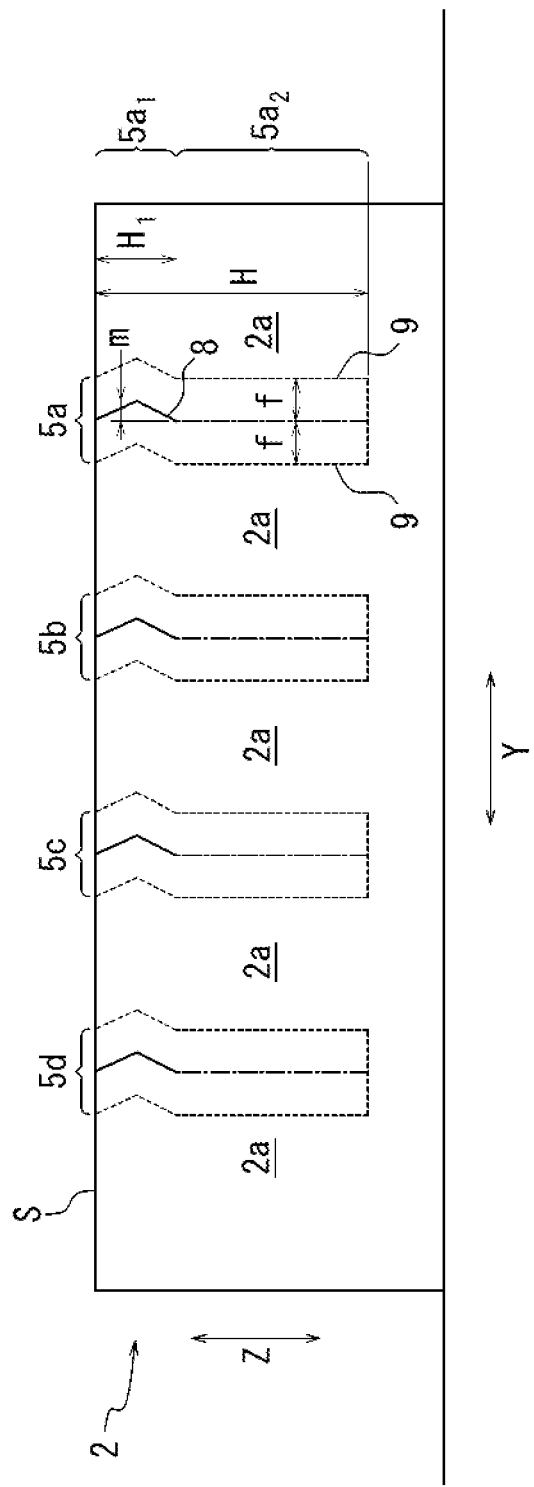

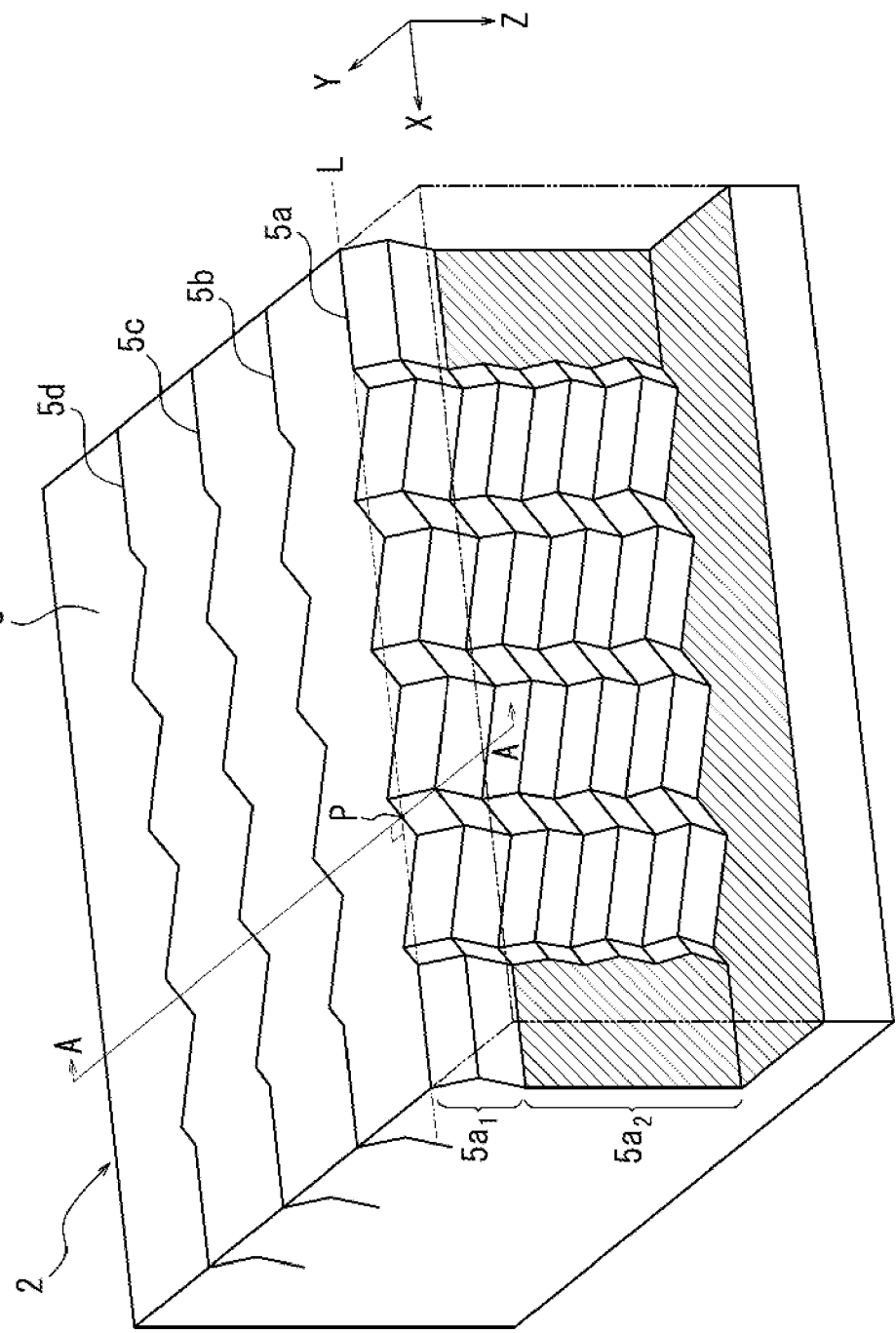

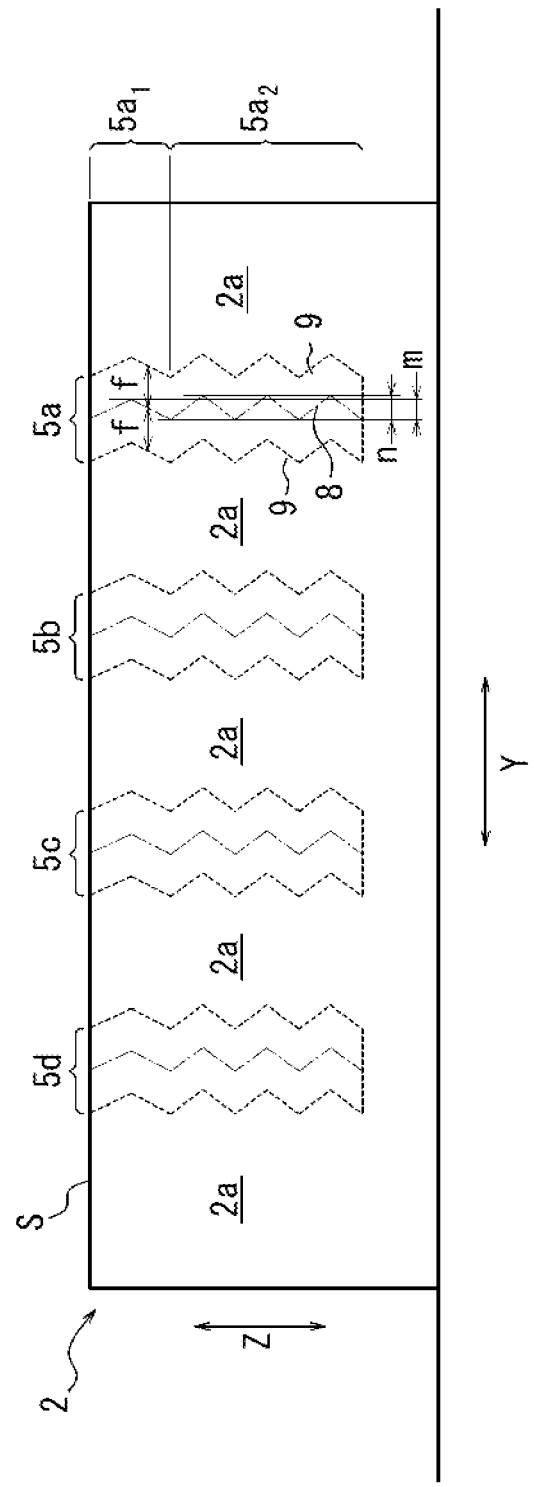

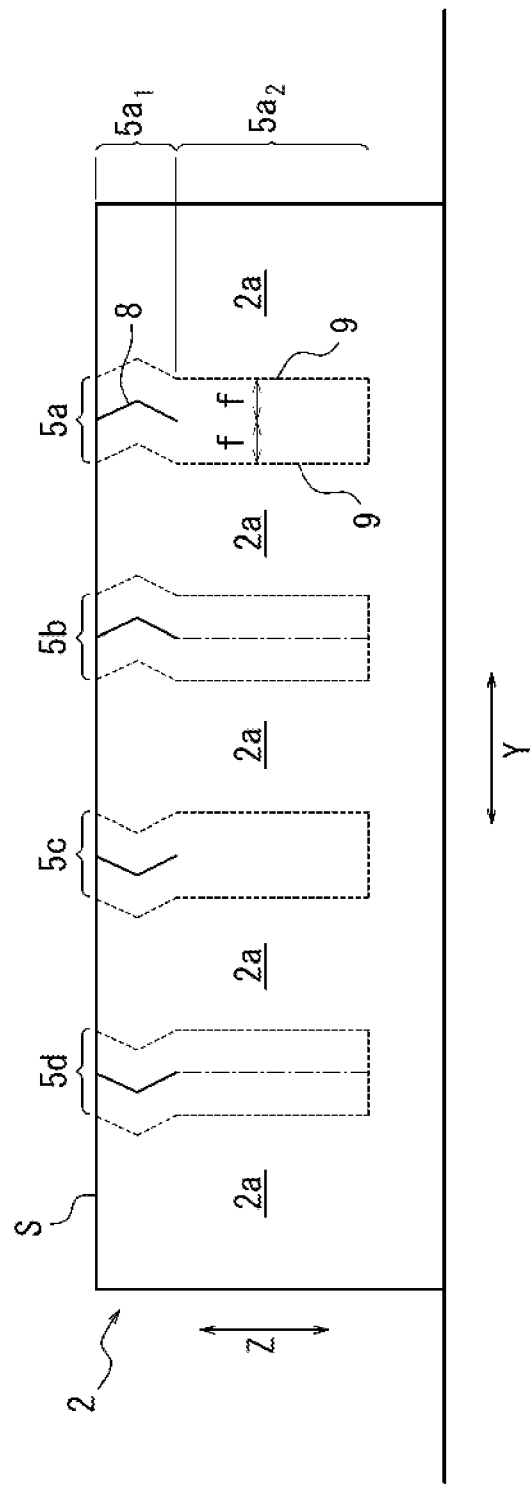

I-I Section

II-II Section

III-III Section

IV-IV Section

V-V Section

B-B Section

C-C Section

B-B Section

C-C Section

B-B Section

C-C Section

PNEUMATIC TIRE

CROSS REFERENCE TO RELATED APPLICATIONS

This application is a National Stage of International Application No. PCT/JP2012/006999 filed Oct. 31, 2012, claiming priorities based on Japanese Patent Application Nos. 2011-242638 filed Nov. 4, 2011, 2011-248104 filed Nov. 11, 2011 and 2012-090490 filed Apr. 11, 2012 the contents of all of which are incorporated herein by reference in their entirety.

TECHNICAL FIELD

The present invention relates to a pneumatic tire including a land portion on a tread portion, the land portion being provided with a sipe that has amplitude in a tire circumferential direction and that extends in a tire width direction. The present invention in particular relates to a pneumatic tire capable of simultaneously providing snow performance, dry performance, and wet performance all at a high level.

BACKGROUND ART

In order to improve braking performance and traction performance on a snowy road, a tire used for driving on the snowy road has conventionally been provided, in a land portion defined on a tread portion, with a plurality of sipes extending in a tire width direction so as to form edge components. One example of such a sipe is a two-dimensional sipe that has a zigzag or a wave pattern on a tread surface and that is configured by an incision extending vertically relative to the tread surface with the pattern remaining unchanged in a depth direction.

As an effective way to improve an edge effect, it is known that the number of the sipes in the land portion should be increased. However, increasing the number of the sipes in the land portion excessively will lead to subdivision of the land portion, resulting in a decrease in rigidity of the land portion. Consequently, although snow performance is improved, a footprint area of the land portion is decreased, and dry performance and wet performance might be deteriorated.

In view of the above, in recent years, there is proposed a three-dimensional sipe which has a pattern varying in the depth direction as well and in which inner walls of the subdivided land portion are brought into contact with each other so as to prevent collapse of the land portion. (Refer to Patent Literature 1, for example.)

CITATION LIST

Patent Literature

PL1: JP200849971A

SUMMARY OF INVENTION

Technical Problem

However, when the three-dimensional sipe is used, although dry performance and wet performance are ensured as described above, the edge effect is deteriorated due to limited deformation of the land portion. Accordingly, the use of the three-dimensional sipe tends to deteriorate snow performance in turn compared with a case using the two-dimensional sipe.

Thus, since the two-dimensional sipe and the three-dimensional sipe have a trade-off relationship, it is difficult to improve snow performance, dry performance, and wet performance all at once in a single land portion. Therefore, further improvement of a conventional pneumatic tire has been strongly desired.

Accordingly, an objective of the present invention is to simultaneously achieve snow performance, dry performance, and wet performance all at a high level in a single land portion in a pneumatic tire provided with a sipe in the land portion.

Solution to Problem

As a result of earnest studies conducted by the present inventor in order to achieve the above objective, it was found that deformation in a land portion subdivided by a sipe during rotation of a tire significantly varied between rotation on a snowy road and that on a dry or a wet road (referred to below as a "normal road"). Specifically, when a vehicle equipped with a tire provided with a sipe in a land portion is driven on a snowy road, the snow side as the road surface is deformed, and as illustrated in FIG. 1A, the land portion subdivided by the sipe undergoes bending deformation where the land portion assumes a single convex shape toward a leading side. On the other hand, according to the finding, when a vehicle equipped with the same tire is driven on a normal road, a land portion surface is restricted (i.e. held) by a road surface, and as illustrated in FIG. 1B, the land portion subdivided by the sipe undergoes bending deformation where the land portion assumes a convex shape toward the leading side from a radially inner side of the tire to a radially outer side of the tire and subsequently, through an inflection point, assumes a convex shape toward a trailing side in turn.

The present inventor discovered that, by focusing on the aforementioned difference in bending deformation occurring in the tire depth direction and by appropriately regulating the pattern of a sipe in accordance with depth positions of the sipe, various performance such as snow performance, dry performance, and wet performance were ensured in a single land portion. Thus, the present invention was achieved.

Specifically, features of the present invention reside in:

A pneumatic tire including a land portion on a tread portion, the land portion being provided with a sipe that has amplitude in a tire circumferential direction and that extends in a tire width direction, wherein in a depth direction extending from a land portion surface toward an inner side in a tire radial direction, the sipe includes: a land portion's surface-side part that is bent toward the tire circumferential direction from the land portion surface; and a land portion's bottom-side part that is bent in a direction different from a direction of the land portion's surface-side part or bent toward the tire circumferential direction by a displacement different from a displacement of the land portion's surface-side part.

Advantageous Effects of Invention

According to a pneumatic tire of the present invention, the edge components oriented in the tire width direction and in the tire circumferential direction are formed on a surface (tread surface) that is in contact with a road surface. As a result, during driving on a snowy road, the edge effect (frictional force due to digging-up) is exerted. Furthermore, the sipe located in the vicinity of the land portion surface is bent in a direction (tire circumferential direction) perpendicular to a sipe longitudinal direction (tire width direction) in the depth direction, and accordingly, when the sipe is opened and the edges dig up snow on a road, an increased part of the land portion penetrates into snow, and snow performance is further improved. On the other hand, in a depth region (land portion's bottom-side part) located on the radially inner side of the tire than the vicinity of the land portion surface, inner wall surfaces of the land portion subdivided by the sipe come into contact with each other. Due to the resulting neighbor interaction, collapse of the land portion is prevented. Consequently, the footprint area of the land portion is sufficiently maintained, and favorable dry performance and wet performance are ensured.

Thus, the present invention makes it possible to simultaneously achieve, in a pneumatic tire provided with sipe(s) in land portion(s), snow performance, dry performance, and wet performance all at a high level in a single land portion.

BRIEF DESCRIPTION OF THE DRAWING

The present invention will be further described below with reference to the accompanying drawings, wherein:

FIG. 2 is a partial development view of a tread portion pertaining to one example of a pneumatic tire according to the present invention;

FIG. 3 is a sectional perspective view of a sipe 5a illustrated in FIG. 2 pertaining to one example of a state in a depth direction;

FIG. 4 is an arrow view of a land portion 2 illustrated in FIG. 3 taken along a line A-A in a tire circumferential direction;

FIG. 5 is a sectional perspective view of the sipe 5a illustrated in FIG. 2 pertaining to another example of a state in the depth direction;

FIG. 6 is an arrow view of the land portion 2 illustrated in FIG. 5 taken along the line A-A in the tire circumferential direction;

FIG. 7 illustrates an example of arrangement in the land portion 2 in which a bent direction of a land portion's surface-side part is varied between sipes;

DESCRIPTION OF EMBODIMENTS

Figure 1A:
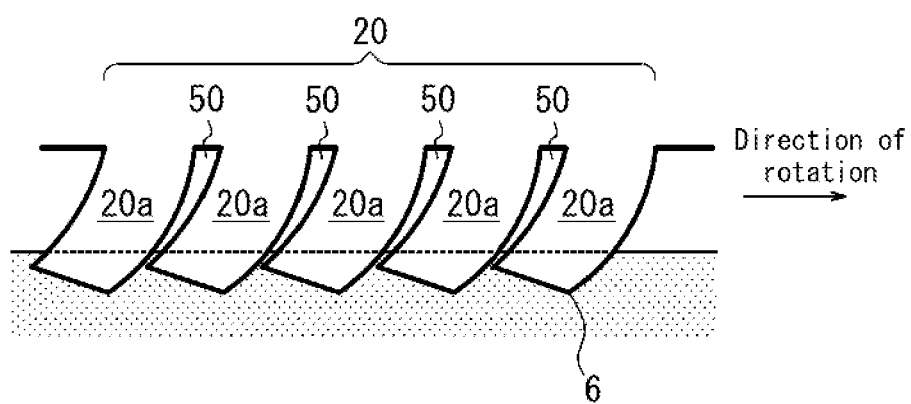
FIG. 1A illustrates a deformed state of a land portion subdivided by a sipe during driving on a snowy road.
Figure 1B:
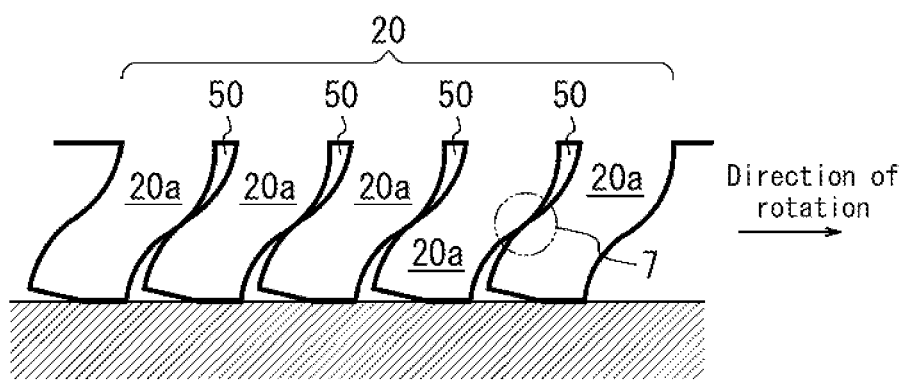
FIG. 1B illustrates a deformed state of the land portion subdivided by the sipe during driving on a normal road.
Figure 9:
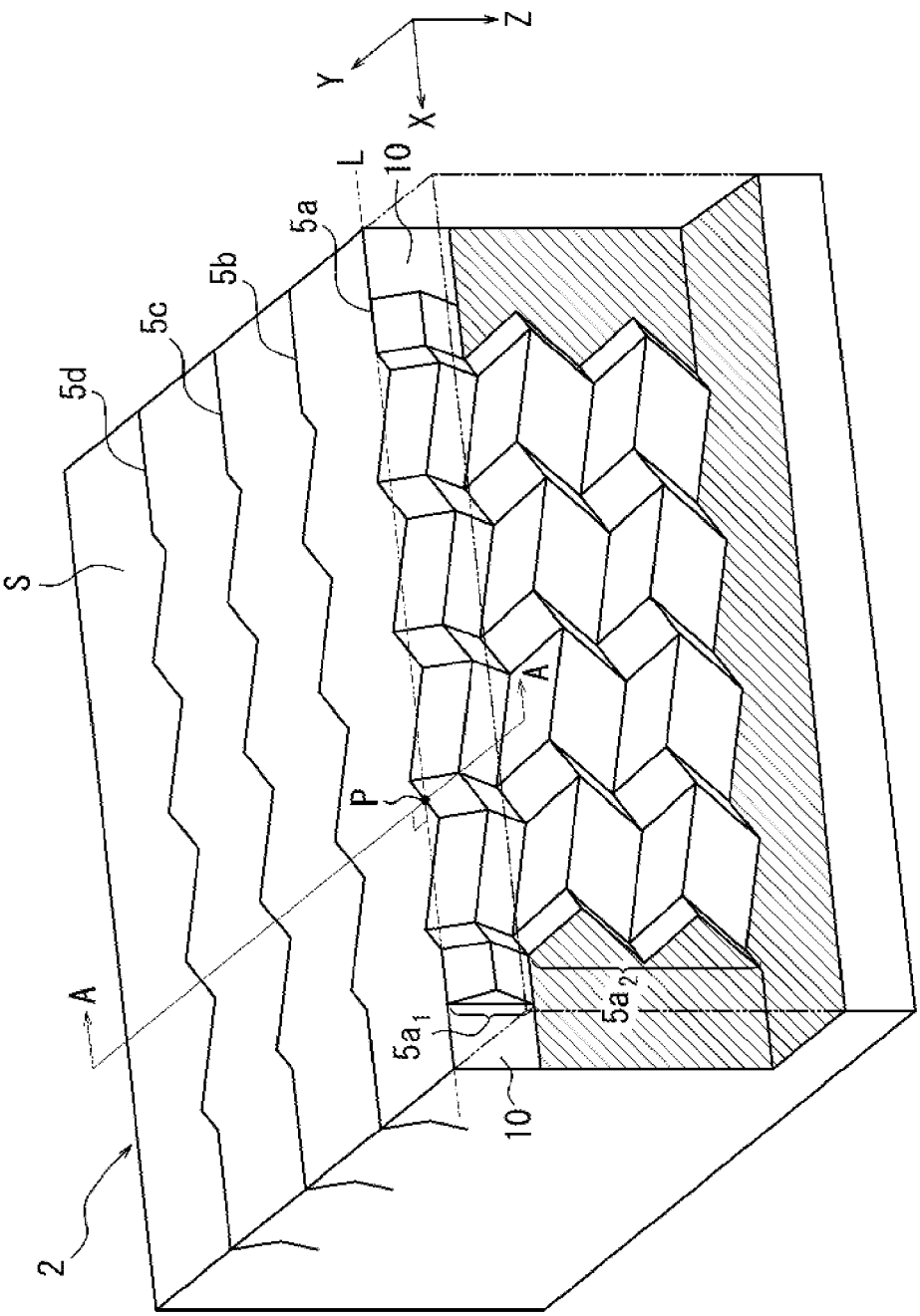
FIG. 9 is a sectional perspective view of one modified example of the sipe whose sectional perspective view is illustrated in FIG. 3.
Figure 10:
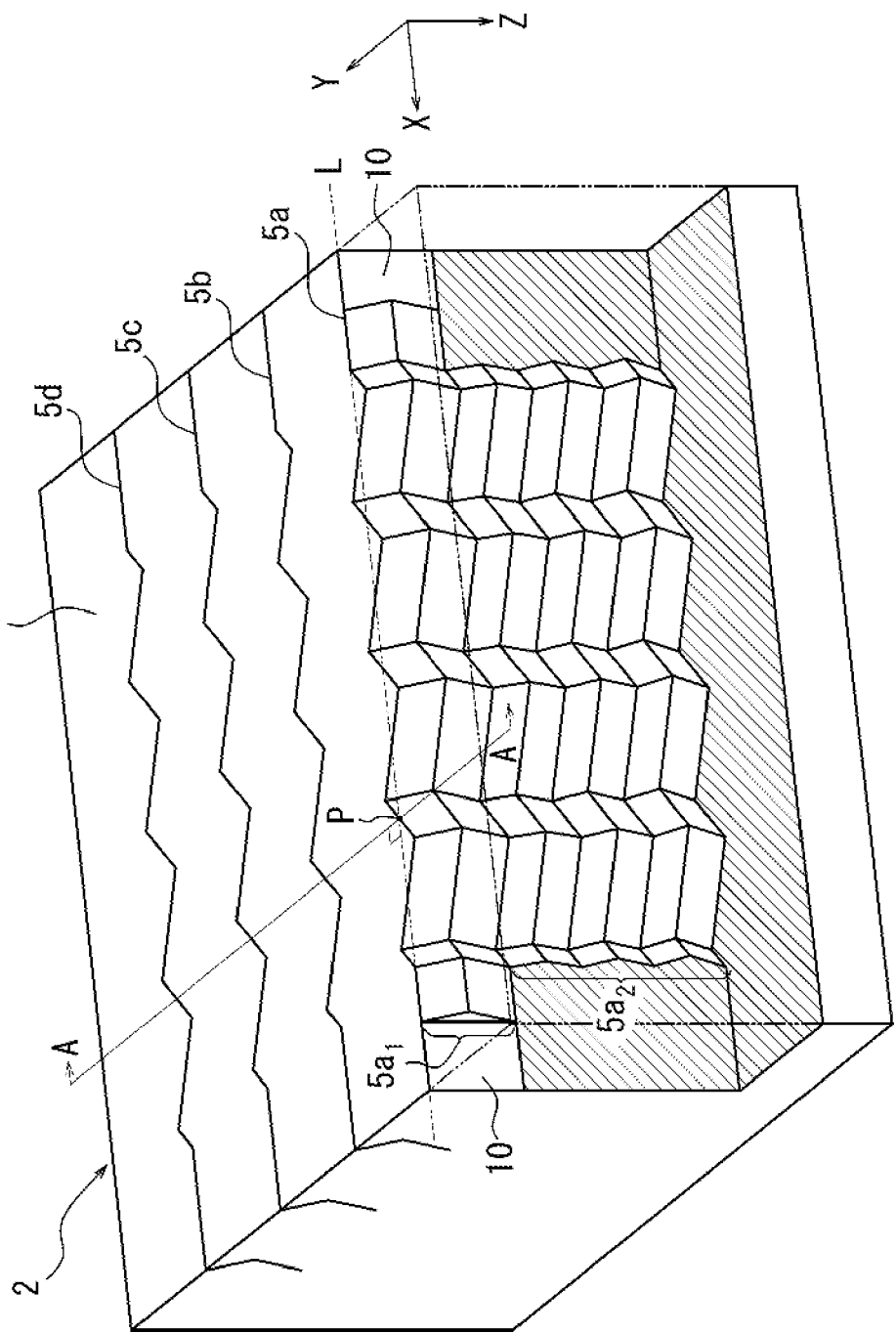
FIG. 10 is a sectional perspective view of one modified example of the sipe whose sectional perspective view is illustrated in FIG. 5.

The following describes a pneumatic tire according to the present invention in detail with reference to the drawings. FIG. 1A illustrates a deformed state of a land portion subdivided by a sipe during driving on a snowy road, and FIG. 1B illustrates a deformed state of the land portion subdivided by the sipe during driving on a normal road. FIG. 2 is a partial development view of a tread portion pertaining to one example of a pneumatic tire (which may be referred to below as a "tire") according to the present invention. FIG. 3 is a sectional perspective view of a sipe 5a illustrated in FIG. 2 pertaining to one example of a state in a depth direction. FIG. 4 is an arrow view of a land portion 2 illustrated in FIG. 3 taken along a line A-A in a tire circumferential direction. In FIG. 4, illustration of any sipe is omitted. FIG. 5 is a sectional perspective view of the sipe 5a illustrated in FIG. 2 pertaining to another example of a state in a depth direction. FIG. 6 is an arrow view of a land portion 2 illustrated in FIG. 5 taken along the line A-A in the tire circumferential direction. In FIG. 6, illustration of any sipe is omitted. FIG. 7 illustrates an example of arrangement in the land portion 2 in which a bent direction on a land portion's surface-side part is varied between sipes. FIGS. 8A-8F illustrate, for the sipe 5a illustrated in FIG. 3, sipe patterns and positions as seen in a plan view in different locations in the depth direction. FIG. 9 is a sectional perspective view of one modified example of the sipe whose sectional perspective view is illustrated in FIG. 3, and FIG. 10 is a sectional perspective view of one modified example of the sipe whose sectional perspective view is illustrated in FIG. 5.

FIG. 2 is a partial development view of a tread portion 1 pertaining to a pneumatic tire (which may be referred to below as a "tire") according to the present invention.

The tread portion 1 includes block-shaped or rib-shaped land portions 2. In the illustrated example, a plurality of block-shaped land portions 2 are defined by circumferential grooves 3 extending in a tire circumferential direction (direction Y indicated in FIG. 2) and lateral grooves 4 extending in a tire width direction (direction X indicated in FIG. 2) to intersect the circumferential grooves 3, so that four block rows are formed in the tire width direction.

Although FIG. 2 illustrates the block-shaped land portions 2 defined by the circumferential grooves 3 and the lateral grooves 4, the land portions of a pneumatic tire according to the present invention may be rib-shaped land portions that are defined solely by circumferential grooves and that extend continuously in the tire circumferential direction.

Additionally, although in FIG. 2 the circumferential grooves 3 each have a straight line shape, a non-straight line shape, such as a zigzag, a sawtooth wave, and a wave shape, may also be possible.

The land portion 2 is provided with a plurality of sipes 5, namely, four sipes 5a-5d in the illustrated example, extending in the tire width direction. Each of the sipes 5a-5d has a zigzag pattern with amplitude f in the tire circumferential direction as FIG. 2 illustrates the pattern as seen in a plan view. The "sipes extending in the tire width direction" herein include a sipe extending obliquely at an angle of 60° or less with respect to a direction parallel to the tire width direction. Accordingly, although in the example illustrated in FIG. 2 each sipe extends in a direction completely parallel to the tire width direction, i.e., a direction perpendicular to the tire circumferential direction, the sipe of a pneumatic tire according to the present invention may be inclined, starting from a tread center line CL, ascendingly in a part of the land portion in a right-hand region of the figure and descendingly in a part of the land portion in a left-hand region of the figure, for example.

Additionally, although in FIG. 2 each sipe 5 has the zigzag pattern in the plan view, the pattern of the sipe 5 in the plan view only needs to be the one extending in the tire width direction with amplitude in the tire circumferential direction. Accordingly, the sipe may have a wave pattern or the like in the plan view. Furthermore, although the single land portion 2 is provided with the four sipes 5a-5d, the number of sipes may be from one to three, or more than or equal to five. Moreover, although in the illustrated example the sipe 5 has ends opened to a corresponding circumferential groove 3 or to a tread end, the ends of the sipe 5 may be terminated in the land portion 2.

In a tire according to the present invention, it is essential that the sipe 5 includes, in a depth direction extending from a land portion surface S toward an inner side in a tire radial direction, a land portion's surface-side part that is bent in a tire circumferential direction from the land portion surface S and a land portion's bottom-side part that is bent in a direction different from that of the land portion's surface-side part or bent in the tire circumferential direction by a displacement different from that of the land portion's surface-side part. In the description herein, "be bent in the tire circumferential direction (or the tire width direction)" includes a state of being bent in a direction inclined with respect to the tire circumferential direction (or the tire width direction).

The sipe 5 according to the present invention refers to an incision with which groove walls of the sipe are at least partly closed when the land portions 2 are grounded and which has an opening width of 0.3-1.0 mm when the land portions 2 are not grounded.

Here, with reference to FIGS. 1A and 1B, a description is given again of the deformed state of the land portion when a vehicle equipped with a tire including a land portion 20 provided with sipes 50 is driven on a snowy road and on a normal road. The land portion 20 is subdivided by the sipes 50 into sub-land portions 20a.

To start with, when the vehicle is driven on a snowy road, the snow side as the road surface is deformed, and as illustrated in FIG. 1A, the sub-land portions 20a divided by the sipes undergoes simple bending deformation where each sub-land portion 20a assumes a single convex shape toward a leading side. On the other hand, when the vehicle is driven on a normal road, a road surface is not deformed, and a land portion surface is restricted by the road surface. Consequently, as seen in terms of deformation from the inner side to the outer side in the tire radial direction, as illustrated in FIG. 1B, the sub-land portions 20a divided by the sipe 50 undergo double bending deformation where the each sub-land portion 20a assumes a convex shape toward the leading side and subsequently, through an inflection point, assumes a convex shape toward the trailing side. In this way, the deformed state of the sub-land portions 20a divided by the sipes is greatly varied in accordance with road surface conditions.

Therefore, by considering the differences in bending deformation of the sub-land portions that occur due to road surface conditions and appropriately arranging sipe patterns in accordance with depth positions, the present invention makes it possible to provide a pneumatic tire that is capable of coping with various road surface conditions in a single land portion.

Specifically, for driving on a snowy road during which the sub-land portions 20a undergo simple bending deformation (FIG. 1A), a sipe that is effective for snow performance is disposed in the vicinity of the land portion surface that often contacts a road surface during rotation of the tire. As a result of disposing of such a sipe in the vicinity of the land portion surface, corner portions 6 of the divided sub-land portions 20a penetrate into snow, and edges are allowed to function effectively. On the other hand, for driving on a normal road during which the sub-land portions 20a undergo double bending deformation (FIG. 1B), a sipe that is effective for prevention of collapse of the sub-land portions 20a is disposed in a center region 7 of the land portion in the depth direction that is located inward of the vicinity of the land portion surface in the tire radial direction. Since inner walls of the divided sub-land portions 20a come into contact with each other in the center region 7 in the depth direction of the land portion, in particular, disposing of such a sipe in the region effectively prevents collapse of the sub-land portions 20a. Consequently, the footprint area of the entire land portion 20 is maintained during driving on a normal road, resulting in improvement in traction performance and braking performance.

In the following, a description is given specifically of characteristic structures of a sipe according to the present invention that is aware of the aforementioned bending deformation, with reference to some embodiments.

<First Embodiment>

FIG. 3 is a sectional perspective view of the sipe 5a illustrated in FIG. 2 pertaining to one example of a state in the depth direction.

As described above, the sipe 5a has a zigzag pattern with amplitude f in a plan view on the land portion surface S. In the depth direction (direction Z) extending from the land portion surface S toward the inner side in the tire radial direction, the sipe 5a is bent and extends while being displaced in the tire circumferential direction (direction Y) and in the tire width direction (direction X). Specifically, the sipe 5a is bent while being displaced in the tire circumferential direction (direction Y) in the vicinity of the land portion surface. The sipe 5a is also bent and extends while being displaced in the tire width direction (direction X) in a region at a greater depth than the vicinity of the land portion surface. In this regard, the sipe 5a extends in the tire radial direction while maintaining the same pattern as the zigzag pattern (amplitude pattern) present on the land portion surface S.

Although FIG. 3 illustrates a sectional appearance of, in particular, the sipe 5a among the plurality of sipe 5, in the illustrated example the sipes 5a-5d are arranged parallel to each other and have the identical sipe pattern.

FIG. 4 is an arrow view of the land portion 2 illustrated in FIG. 3 taken along the line A-A in the tire circumferential direction. More specifically, FIG. 4 illustrates one example of a sectional view of the land portion 2 when, supposing that a point P is defines as an intersection point between a center line L of the amplitude of the zigzag-patterned sipe 5a and the sipe 5a (i.e. position at which the amplitude of the sipe 5a is zero) on the land portion surface S as illustrated in FIG. 2, the land portion 2 is cut along a surface perpendicular to the land portion surface S such that the surface passes the point P and extends perpendicularly with respect to the center line L. Here, the center line L of the amplitude of the sipe 5a refers to a virtual line representing a mean position of the sipe 5a, which is displaced in the tire circumferential direction, in the tire circumferential direction. In other words, the center line L refers to a line situated midway in the tire circumferential direction between two straight lines passing maximum (i.e. outermost) positions of the sipe 5a in the tire circumferential direction and extending in the tire width direction.

The land portion 2 is subdivided by the four sipes 5a-5d into five sub-land portions 2a. Here, supposing that the land portion 2 is cut along surfaces parallel to the land portion surface S, reference numeral 8 in FIG. 4 indicates a surface (referred to below as a sipe center surface 8) formed by connecting the center line of amplitude of the sipe 5, which has the zigzag pattern on each of the sections, in the tire radial direction. That is to say, reference numeral 8 indicates a trajectory on the section A-A of the center line of the amplitude of the sipe 5 extending in the tire radial direction while maintaining the zigzag pattern on the land portion surface S. Reference numeral 9 indicated by a dotted line refers to bent points of the sipes, i.e., maximum amplitude positions of the sipes, when the sipes 5a-5d are seen through along the section A-A of the land portion 2. Accordingly, in the example of the sipe 5 having amplitude f, a distance from the sipe center surface 8 to the dotted line 9 is f.

As described earlier, the sipe 5a is characterized by including the land portion's surface-side part $5a_1$ that is bent from the land portion surface S toward the tire circumferential direction in the depth direction extending from the land portion surface S toward the inner side in the tire radial direction. In other words, in the section illustrated in FIG. 4, the sipe 5a is characterized in that the center surface 8 starts to be displaced right from the land portion surface S and is displaced to be convex in a right direction or in a left direction in the figure (in the right direction in the figure in the illustrated example) in the vicinity of the land portion surface, and then, the center surface 8 returns to the same position as the position in the tire circumferential direction on the land portion surface S.

In this way, a tire according to the present invention includes, in the vicinity of the land portion surface, a sipe having the zigzag pattern in the plan view on the land portion surface S and also includes, in the depth direction, a sipe that is bent in a direction (the tire circumferential direction in the illustrated example) perpendicular with respect to the longitudinal direction (the tire width direction in the illustrated example) of the sipe. As a result, naturally, edge components are formed on the land portion surface S, and traction performance is improved in a region grounded on a snowy surface, and moreover, snow performance is improved in the depth direction of the land portion. That is to say, with the above structure, when the sipe is opened, and the land portion digs up snow on a road surface, an increased part of the land portion penetrates into snow, and a contact area with snow and the amount of snow to be dug are also increased. Consequently, snow performance in the vicinity of the land portion surface is further improved.

Furthermore, in a tire according to the present invention, the sipe 5a is characterized by including, in an inner side region than the land portion's surface-side part $5a_1$ in the tire radial direction, a land portion's bottom-side part $5a_2$ that is bent and extends in a direction different from that of the land portion's surface-side part $5a_1$, that is to say, in the tire width direction in the first embodiment. In other words, in the section illustrated in FIG. 4, the sipe 5a is characterized in that the sipe center surface 8 is in the form of a straight line without being displaced in the left and the right direction in the figure.

Figure 8A:
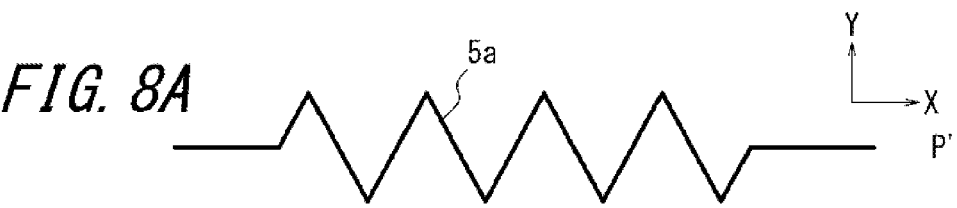
FIGS. 8A-8F illustrate, for the sipe 5a illustrated in FIG. 3, sipe patterns and positions as seen in a plan view in different locations in the depth direction.
Figure 8B:
Figure 8C:
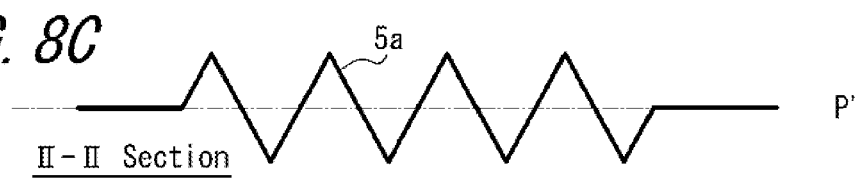
Figure 8D:
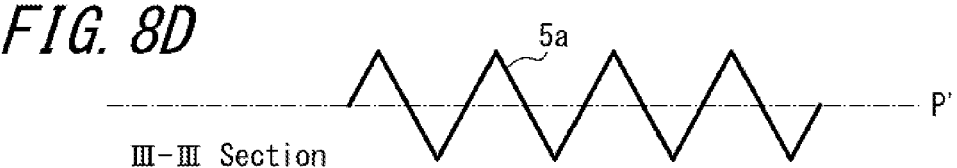
Figure 8E:
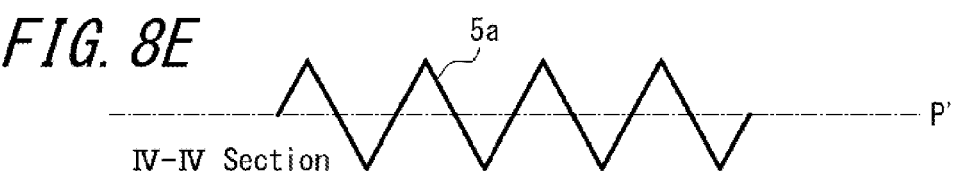
Figure 8F:
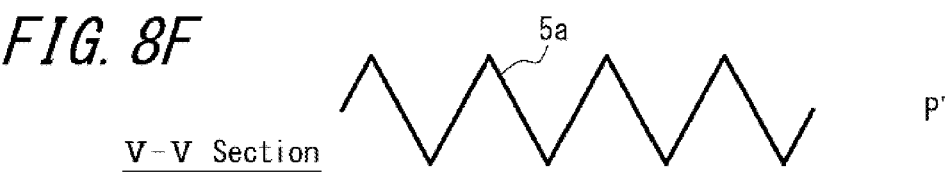

More specifically, as illustrated in FIGS. 8A-8F, the pattern of the sipe 5a in the plan view as seen from the land portion surface side varies in the depth direction of the sipe 5a. Specifically, as FIG. 8A illustrates the pattern of the sipe 5a in the plan view in a land portion surface position, FIG. 8B illustrates the pattern of the sipe 5a in the plan view in a position I-I in FIG. 3, FIG. 8C illustrates the pattern of the sipe 5a in the plan view in a position II-II in FIG. 3, FIG. 8D illustrates the pattern of the sipe 5a in the plan view in a position III-III in FIG. 3, FIG. 8E illustrates the pattern of the sipe 5a in the plan view in a position IV-IV in FIG. 3, and FIG. 8F illustrates the pattern of the sipe 5a in the plan view in a position V-V in FIG. 3, the sipe 5a is deformed (bent) in the depth position. In FIGS. 8A-8F, a line P' indicates a position of a virtual plane passing the center line L located on the land portion surface and extending in the tire radial direction.

It can be seen from FIGS. 8A-8C that, in the land portion's surface-side part $5a_1$ in a direction extending inward in the tire radial direction from a side of the land portion surface, the sipe 5a is displaced toward one side in the tire circumferential direction (downward in FIG. 8) while maintaining the pattern (zigzag pattern) in the plan view and subsequently returns to the original position (same as the land portion surface) in the tire circumferential direction. It can also be seen from FIGS. 8C-8F that, in the land portion's bottom-side part $5a_2$ in a direction extending inward in the tire radial direction from the land portion surface side, the sipe 5a is displaced toward one side in the tire width direction (to the right in FIG. 8) while maintaining the pattern (zigzag pattern) in the plan view and subsequently returns to the original position in the tire width direction. Since in the land portion's bottom-side part $5a_2$ the sipe 5a is displaced toward one side in the tire width direction (to the right in FIG. 8) without changing the position in the tire circumferential direction, in the section illustrated in FIG. 4, the sipe center surface 8 is in the form of a straight line without displacement in the left-right direction in the figure.

When force is applied to the land portion 2 during driving on a normal road, collapse occurs in the sub-land portions 2a divided by the sipes. In this circumstance, as described earlier with reference to FIG. 1B, the sub-land portions come into contact each other in the middle region in the depth direction of the land portion. Accordingly, by bending the sipe 5a in the tire width direction at least in the above region (i.e., by displacing the sipe 5a in the tire width direction in the land portion's bottom-side part while the pattern of the sipe 5a in the plan view is maintained), adjacent sub-land portions 2a are engaged at the bent portions thereof with each other. As a result, collapse of the sub-land portions is effectively prevented. Consequently, the footprint area of the land portion is sufficiently maintained, and traction performance and braking performance during driving on a normal road are improved.

<Second Embodiment>

FIG. 5 is a sectional perspective view of the sipe 5a illustrated in FIG. 2 pertaining to another example of a state in the depth direction.

The sipe 5a has a zigzag pattern with amplitude f on the land portion surface S. In the depth direction (direction Z) extending from the land portion surface S toward the inner side in the tire radial direction, the sipe 5 is bent and extends while being displaced in the tire circumferential direction (direction Y). In this case, the sipe 5a extends in the tire radial direction while maintaining the same pattern as the zigzag pattern present on the land portion surface S.

Although FIG. 5 illustrates a sectional appearance of, in particular, the sipe 5a among the plurality of sipe 5 illustrated in FIG. 2, in the illustrated example the sipes 5a-5d are arranged parallel to each other and have the identical pattern.

Next, reference is made to FIG. 6 which is an arrow view of the land portion 2 illustrated in FIG. 5 taken along the line A-A in the tire circumferential direction. More specifically, FIG. 6 illustrates another example of the sectional view of the land portion 2 when, as illustrated in FIG. 2, the land portion 2 is cut along a surface perpendicular to the land portion surface S such that the surface passes the point P and extends perpendicularly with respect to the center line L.

In a tire according to the present embodiment, as in the first embodiment, the sipe 5a is characterized by including the land portion's surface-side part $5a_1$ that is bent (displaced) from the land portion surface S toward the tire circumferential direction in the depth direction extending from the land portion surface S toward the inner side in the tire radial direction. In other words, in the section illustrated in FIG. 6, the sipe 5a is characterized in that the center surface 8 is displaced to be convex in a right direction or in a left direction in the figure (in the right direction in the figure in the illustrated example) in the vicinity of the land portion surface and then, the center surface 8 returns to the same position as the tire circumferential direction position on the land portion surface S.

With the above structure, as described above, traction performance on a snowy road is improved, and the degree of penetration of the land portion into snow and the amount of snow to be dug are also increased. As a result, snow performance is further improved.

The second embodiment differs from the first embodiment in that the sipe 5a is characterized by including, in a region inner than the land portion's surface-side part $5a_1$ in the tire radial direction, the land portion's bottom-side part $5a_2$ that is bent in the tire circumferential direction by a displacement n that is different from a displacement m of the land portion's surface-side part $5a_1$. In other words, in the section illustrated in FIG. 6, the sipe 5 is characterized in that, although the sipe center surface 8 in the region inner than the vicinity of the land portion surface in the tire radial direction assumes a bent shape in the left-right direction in the figure similarly to the land portion's surface-side part $5a_1$, the displacement n of the land portion's bottom-side part $5a_2$ in the tire circumferential direction differs from the displacement m of the land portion's surface-side part $5a_1$ in the tire circumferential direction. Note that "displacement" equals twice the amplitude (i.e. wave height) of the sipe center surface 8 in the section in the tire circumferential direction.

With the above structure, at the time of collapse of the sub-land portions 2a, the bent portions of the sub-land portions engage with each other in the region for mutual contact of the sub-land portions, and as a result, collapse of the sub-land portions is effectively prevented. Furthermore, by bending both the land portion's surface-side part $5a_1$ and the land portion's bottom-side part $5a_2$ in the tire circumferential direction while varying the displacement thereof, performance on a snowy road and that on a normal road are both satisfied. Consequently, the footprint area of the land portion is sufficiently maintained, and traction performance and braking performance during driving on a normal road are improved.

It is preferable that the displacement n of the land portion's bottom-side part $5a_2$ in the tire circumferential direction is greater than the displacement m of the land portion's surface-side part $5a_1$ in the tire circumferential direction (m<n). The reason is that, with the above structure, a degree of engagement between sub-land portions 2a, i.e., effect of the mutual support between sub-land portions, is increased.

Other points of the structure of the sipe 5 and the remaining structures in the second embodiment are substantially the same as those in the first embodiment, and a description thereof is omitted.

In the first and the second embodiment, as illustrated in FIGS. 3 and 5, a sipe 5 preferably has a smaller sipe depth in both the ends in the sipe width direction than in the middle in the sipe width direction. The above is described specifically with reference to FIGS. 3 and 5. For example, at both the ends of the sipe 5a provided on the land portion 2 to extend in the tire width direction, preferably, only the land portion's surface-side part $5a_1$ is formed to extend from the land portion surface S toward the inner side in the tire radial direction. On the other hand, in the middle of the sipe, in the direction extending from the land portion surface S toward the inner side in the tire radial direction, in addition to the land portion's surface-side part $5a_1$, preferably, the land portion's bottom-side part $5a_2$ is also provided in the inner side than the land portion's surface-side part $5a_1$ in the tire radial direction. The "sipe width direction" refers to a longitudinal direction of the sipe, and "both the ends in the sipe width direction" refer to both the ends of the sipe in the longitudinal direction.

As described above, since a sipe provided on the land portion subdivides the land portion, compared with a case without a sipe, rigidity of the land portion is deteriorated. In view of the above, by providing a sipe with a small depth at both the ends of the land portion 2 in the width direction, rigidity of the land portion is secured, and collapse of the land portion is prevented. As a result, dry performance and wet performance during driving on a normal road are further improved. Furthermore, since the land portion's surface-side part $5a_1$ is provided at both the ends of the land portion in the width direction, snow performance during driving on a snowy road is ensured at the same time.

In the first and the second embodiment, depth H1 of the land portion's surface-side part $5a_1$ is preferably 20-40%, more preferably 25-35%, of maximum depth H of the sipe.

By arranging the land portion's surface-side part $5a_1$ within the above range, an increased part of the land portion is likely to penetrate into snow during driving on a snowy road. As a result, functions of the sipe in the vicinity of the land portion surface are sufficiently exerted, and snow performance is improved. On the other hand, as illustrated in FIG. 1B, sub-land portions divided by a sipe contact each other in the middle region in the depth direction of the land portion during driving on a normal-road. Accordingly, by arranging the land portion's bottom-side part $5a_2$ in the region at a greater depth than 20-40% of the maximum depth H of the sipe from the land portion surface S, collapse of the land portion is sufficiently prevented, and dry performance and wet performance are improved. In this way, by arranging the land portion's surface-side part $5a_1$ within the above range, improvement in snow performance by the sipe in the land portion's surface-side part $5a_1$ and improvement in dry performance and wet performance by prevention of collapse in the land portion's bottom-side part $5a_2$ are most efficiently implemented.

The maximum depth H of the sipe may be 60-90% of a depth of a circumferential groove.

In the first and the second embodiment, as illustrated in FIGS. 3 and 4, the land portion's surface-side part $5a_1$ preferably includes a single bent point.

As in the embodiments, when the sipe $5a$ is largely bent only once in the tire circumferential direction in the vicinity of the land portion surface, resistance of the land portion's surface-side part $5a_1$ penetrating into snow with respect to a road surface is increased. As a result, the degree of penetration of the land portion into snow and the amount of snow to be dug are increased, and due to the edge effects, snow performance is further improved.

In the first and the second embodiment, the displacement m of the sipe center surface 8 of the land portion's surface-side part $5a_1$ in the tire circumferential direction between the starting point of the sipe center surface 8 on the land portion surface S and the bent point is preferably 0.2-0.4 times a distance (dimension) H1 of the land portion's surface-side part $5a_1$ in the depth direction.

By regulating the degree of bending of the land portion's surface-side part $5a_1$ within the above range, the degree of penetration of sub-land portions $2a$ into snow and the amount of snow to be dug are increased. As a result, snow performance is further improved.

Although, as illustrated in FIGS. 4 and 6, in the first and the second embodiment the land portion's surface-side parts $5a_1$ of the plurality of sipes 5 in the land portion 2 are all bent in the same direction, a tire according to the present invention only has to have the aforementioned sipe pattern. As illustrated in FIG. 7, for example, the land portion's surface-side parts $5a_1$ in the land portion 2 may be bent in different directions.

In the first and the second embodiment, as illustrated in FIGS. 3 and 5 for the sipe $5a$, the sipe depth at both the ends in the sipe width direction is smaller than the sipe depth in the middle in the sipe width direction. At both the ends in the sipe width direction, only the land portion's surface-side part $5a_1$ is provided in the direction extending from the land portion surface S toward the inner side in the tire radial direction. However, in a tire according to the present invention, it is also possible to provide, on at least one of both the ends in the sipe width direction, a vertical portion that extends inward in the tire radial direction from the land portion surface S. The "extend inward in the tire radial direction" means that the vertical portion extends at an angle of 10° or less with respect to a direction parallel to the tire radial direction. The angle between the vertical portion and the land portion surface S may be 80-90°.

Specifically, as FIG. 9 illustrates one modified example of the sipe whose sectional perspective view is illustrated in FIG. 3, and FIG. 10 illustrates one modified example of the sipe whose sectional perspective view is illustrated in FIG. 5, in a tire according to the present invention, a vertical portion 10 may be provided at both the ends in the sipe width direction. The vertical portion 10 may be open to a circumferential groove or to a tread end. By providing the vertical portion 10, when a sipe is formed using a blade for sipe formation arranged on an inner circumferential surface (tread molding surface) of a vulcanization mold, arrangement (implantation) of the blade for sipe formation on the inner circumferential surface of the vulcanization mold is simplified. As a result, manufacturing of a tire is facilitated.

From a viewpoint of improving dry performance and wet performance by maintaining rigidity of the land portion and improving snow performance sufficiently, depth of the vertical portion 10 is preferably smaller than the depth of the sipe in the middle in the sipe width direction. Furthermore, from a viewpoint of simplifying manufacturing of the vulcanization mold and ensuring snow performance sufficiently, width of the vertical portion 10 in a direction in which the sipe extends is preferably 0.1-0.5 mm. Moreover, from a viewpoint of ensuring snow performance sufficiently, as illustrated in FIGS. 9 and 10, a tire according to the present invention preferably includes, at both the ends in the sipe width direction, a portion provided only with the vertical portion 10 having a smaller sipe depth than the middle in the sipe width direction and the land portion's surface-side part $5a_1$ having a smaller sipe depth than the middle in the sipe width direction.

The present inventor found that, by appropriately arranging the sipe as described above on the tread portion, each performance of a pneumatic tire as a whole was even further improved. Specifically, the present inventor found that snow performance, dry performance, and wet performance were simultaneously achieved all at a high level by arranging the characteristic sipe as described above on the land portion in consideration of a bent direction of the land portion's surface-side part toward the tire circumferential direction. A description is given of arrangement patterns of the sipe that are capable of simultaneously providing snow performance, dry performance, and wet performance all at a high level.

Similarly to the example illustrated in FIG. 2, a pneumatic tire with an example of arrangement pattern as described below includes block-shaped land portions arranged in a line in the tire circumferential direction to form a land portion row, and four land portion rows are arranged in the tire width direction (Refer to FIG. 11.). Each land portion is provided with two or more (four in the illustrated example) sipes.

Figure 11:
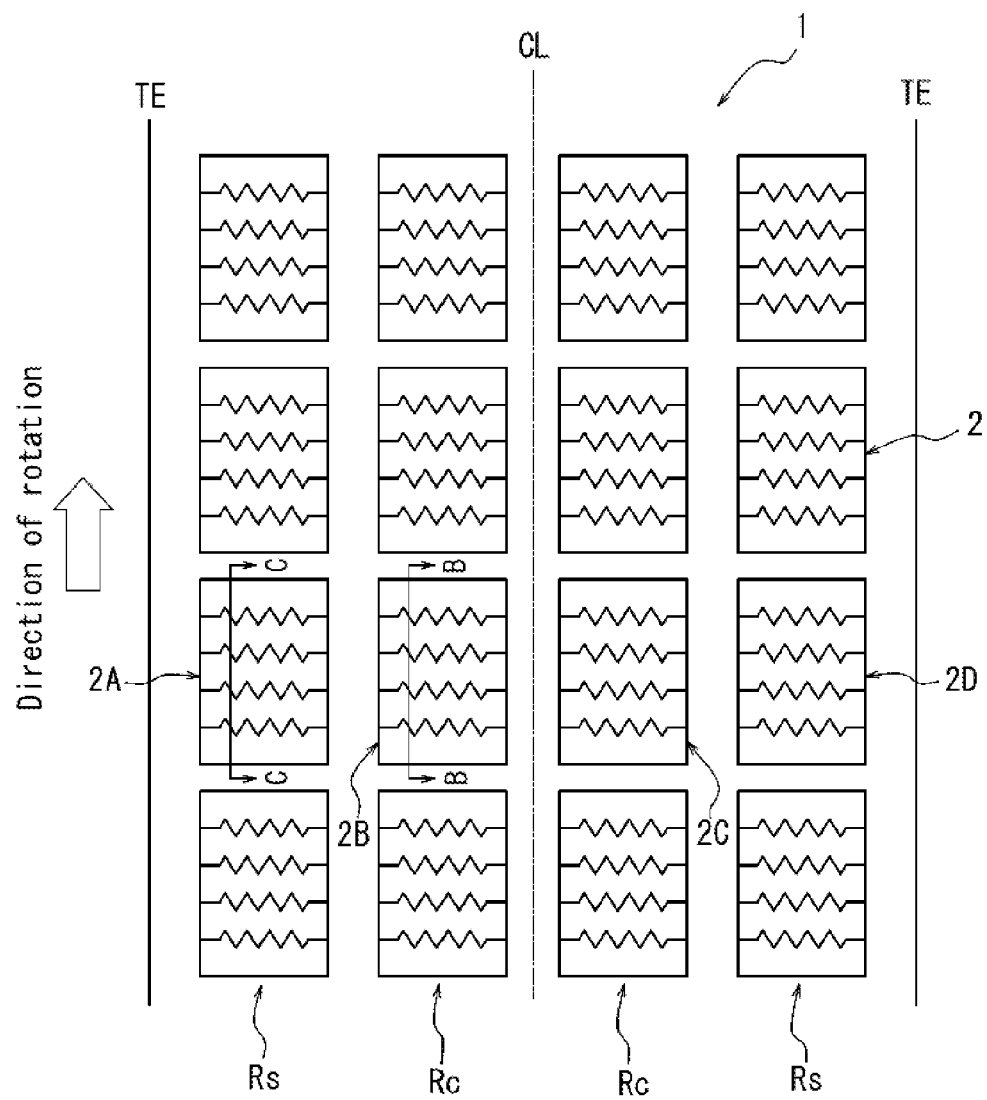
FIG. 11 is a partial development view of a tread portion pertaining to another example of a pneumatic tire according to the present invention.

The pneumatic tire has a direction of rotation indicated by an arrow in FIG. 11 during positive rotation of the tire. A sipe provided in each land portion is identical to that illustrated in FIGS. 3 and 4 according to the first embodiment that includes the land portion's surface-side part bent in the tire circumferential direction and the land portion's bottom-side part bent in the tire width direction.

In the following, among the plurality of land portions 2 arranged on the tread portion 1, the land portions located closer to tread ends TE are called shoulder-side land portions $R_S$, and the land portions located closer to a tire equatorial line CL than the shoulder-side land portions $R_S$ are called center-side land portions $R_C$. The shoulder-side land portions $R_S$ are located at least closer to the tread ends. In the example illustrated in FIG. 11, the shoulder-side land portions $R_S$ correspond to all the land portions located on the same line extending in the tire circumferential direction as the land portion 2A to form the corresponding land portion row, and all the land portions located on the same line extending in the tire circumferential direction as the land portion 2D to form the corresponding land portion row. On the other hand, the center-side land portions $R_C$ are located closer to the tire equator than the shoulder-side land portions $R_S$. In the example illustrated in FIG. 11, the center-side land portions $R_C$ correspond to all the land portions located on the same line extending in the tire circumferential direction as the land portion 2B to form the corresponding land portion row, and all the land portions located on the same line extending in the tire circumferential direction as the land portion 2C to form the corresponding land portion row.

<First Arrangement Pattern>

In a first arrangement pattern, it is essential to arrange sipes 5 relative to land portions 2 such that the respective land portion's surface-side parts of a plurality of sipes are all bent in the same direction toward the tire circumferential direction in the corresponding single land portion row of the land portions arranged in a line in the tire circumferential direction. That is to say, in arrow sectional views (FIGS. 12A and 12B) of the land portion 2 illustrated in FIG. 11 cut along the tire circumferential direction, the sipe center surface 8 is bent only in one of left and right directions in the figure in the vicinity of the land portion surface.

In the first arrangement pattern, the bent direction of the land portion's surface-side parts of the sipes provided in the shoulder-side land portions $R_S$ toward the tire circumferential direction is different from the bent direction of the land portion's surface-side parts of the sipes provided in the center-side land portions $R_C$ toward the tire circumferential direction.

For snow performance, starting acceleration performance is important. Accordingly, snow performance is largely affected by the rigidity of the land portions in a tread center region. On the other hand, for dry performance and wet performance, braking performance is important. Accordingly, dry performance and wet performance are greatly affected by the rigidity of the land portions in tread shoulder regions. In this regard, with the sipe arrangement according to the first arrangement pattern, snow performance in particular is improved in the center region, while dry performance and wet performance in particular are improved in the shoulder regions.

Figure 12A:
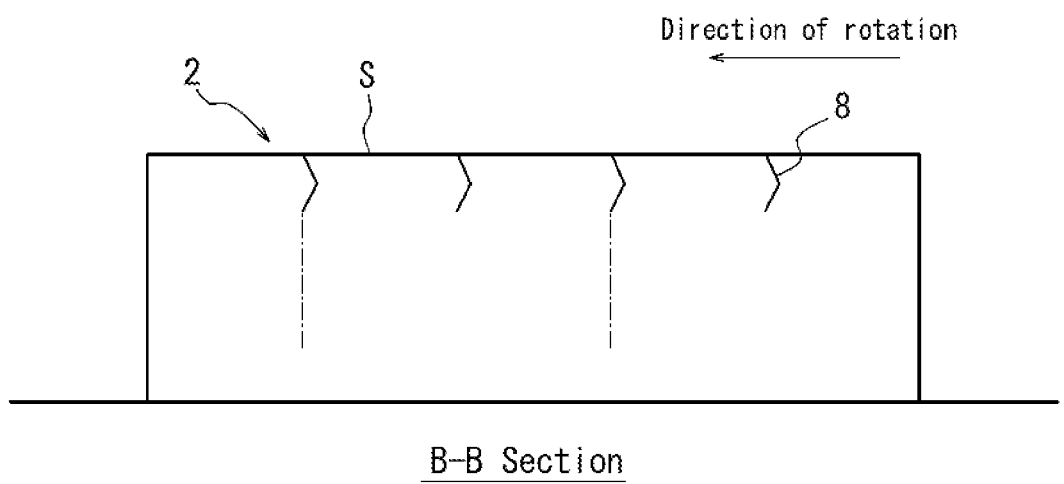
FIG. 12A is one example of an arrow sectional view of a land portion 2B illustrated in FIG. 11 taken along a line B-B in the tire circumferential direction.

Such improvement in performance is eminent especially when the sipes 5 are arranged in the center-side land portions $R_C$ such that the bent direction of the land portion's surface-side parts is opposite to the direction of rotation of the tire, that is to say, toward the trailing side, as illustrated in the arrow sectional view of the land portion 2B taken along B-B in the tire circumferential direction in FIG. 12A. On the other hand, such improvement in performance is eminent when the sipes 5 are arranged in the shoulder-side land portions $R_S$ such that the bent direction of the land portion's surface-side parts is directed in the direction of rotation of the tire, that is to say, toward the leading side, as illustrated in the arrow sectional view of the land portion 2A taken along C-C in the tire circumferential direction in FIG. 12B.

With the above arrangement, in the center region effective for snow performance, at the time of leading during positive rotation of the tire, the sipes in the land portion's surface-side parts are opened. As a result, the edges dig up snow on a road surface, and the degree of penetration of the land portions into snow is increased. On the other hand, in the shoulder regions effective for dry performance and wet performance, since the bent convex portions of the land portion's surface-side parts correspond to the leading side, lifting and deformation of the shoulder regions are prevented during braking input, and the footprint area is maintained.

Although FIG. 11 illustrates the example where only the land portions closest to the tread ends are considered as the shoulder-side land portions $R_S$, and the two land portion rows in the middle are considered as the center-side land portions $R_C$, in case of five land portion rows, land portions in the land portion rows closer to the tread ends may be considered as the shoulder-side land portions $R_S$, and the three land portion rows in the middle may be considered as the center-side land portions $R_C$. Alternatively, only the one land portion row in the middle may be considered as the center-side land portion $R_C$, and the remaining land portions may be considered as the shoulder-side land portions $R_S$.

Although FIG. 11 illustrates the case with the block-shaped land portions 2, the first arrangement pattern may also be applied to rib-shaped land portions 2. In this case, it is essential to arrange sipes 5 relative to land portions 2 such that the respective land portion's surface-side parts of a plurality of sipes are all bent in the same direction toward the tire circumferential direction in the corresponding single rib-shaped land portion extending continuously in the tire circumferential direction.

<Second Arrangement Pattern>

In a second arrangement pattern, similarly to the first arrangement pattern, it is essential to arrange sipes 5 relative to land portions 2 such that the respective land portion's surface-side parts of a plurality of sipes are all bent in the same direction toward the tire circumferential direction in the corresponding single land portion row of the land portions arranged in a line in the tire circumferential direction.

In the second arrangement pattern, the bent direction of the land portion's surface-side parts of the sipes provided in the shoulder-side land portions $R_S$ toward the tire circumferential direction is the same as the bent direction of the land portion's surface-side parts of the sipes provided in the center-side land portions $R_C$ toward the tire circumferential direction.

That is to say, in the second arrangement pattern, the respective land portion's surface-side parts of the sipes 5 provided on the tread portion 1 are all bent in the same direction.

With the above arrangement pattern, the land portion's surface-side parts of the sipes have the same bent direction in all the regions on the tread portion. Accordingly, any of snow performance, dry performance, or wet performance whose improvement is particularly required is improved over the entire tread portion.

Specifically, when the sipes are arranged such that the bent direction of the land portion's surface-side parts in the center-side land portions $R_C$ is directed to the direction of rotation of the tire (FIG. 13A), and the bent direction of the land portion's surface-side parts in the shoulder-side land portions $R_S$ is also directed to the direction of rotation of the tire (FIG. 13B), dry performance and wet performance are particularly improved.

The reason is that lifting and deformation of the bent convex portions of the land portion's surface-side parts are prevented over all the regions on the tread portion during braking input, and the footprint area is sufficiently maintained.

When the sipes are arranged such that the bent direction of the land portion's surface-side parts in the center-side land portions $R_C$ is directed opposite to the direction of rotation of the tire (FIG. 14A), and the bent direction of the land portion's surface-side parts in the shoulder-side land portions $R_S$ is also directed opposite to the direction of rotation of the tire (FIG. 14B), snow performance is particularly improved.

When the land portion is grounded on a road surface, the sipes in the land portion's surface-side parts are opened over all the regions on the tread portion. As a result, the edges dig up snow on the road surface, and the degree of penetration of the land portions into snow is increased.

Although FIG. 11 illustrates the case with the block-shaped land portions 2, the second arrangement pattern may also be applied to rib-shaped land portions. In this case, it is essential to arrange sipes 5 relative to land portions 2 such that the respective land portion's surface-side parts of a plurality of sipes are bent in the same direction toward the tire circumferential direction in any rib-shaped land portions.

<Third Arrangement Pattern>

In a third arrangement pattern described below, first of all, it is essential to arrange sipes 5 relative to land portions 2 such that the respective land portion's surface-side parts of a plurality of sipes are bent in opposite directions in a region closer to one side of the corresponding single block-shaped land portion in the tire circumferential direction and in a region closer to the other side of the corresponding single block-shaped land portion in the tire circumferential direction.

Figure 15:
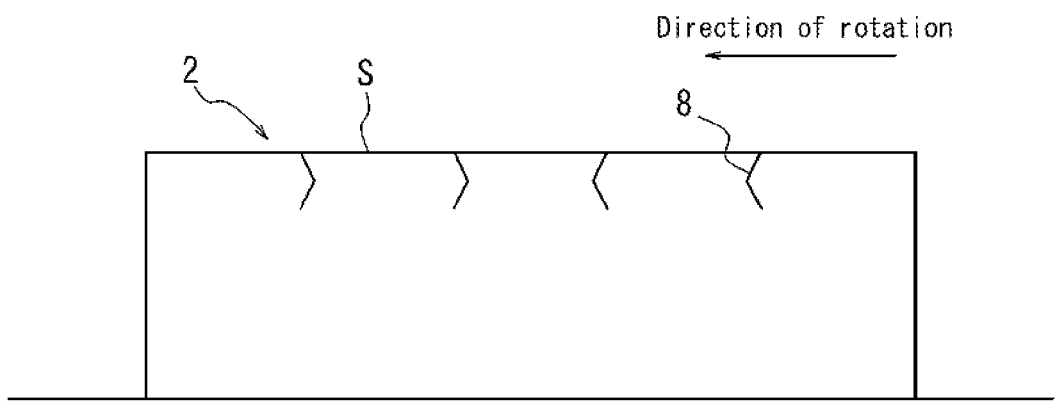
FIG. 15 is one example of an arrow sectional view of the land portion 2 illustrated in FIG. 11 taken along the line B-B in the tire circumferential direction.
Figure 16:
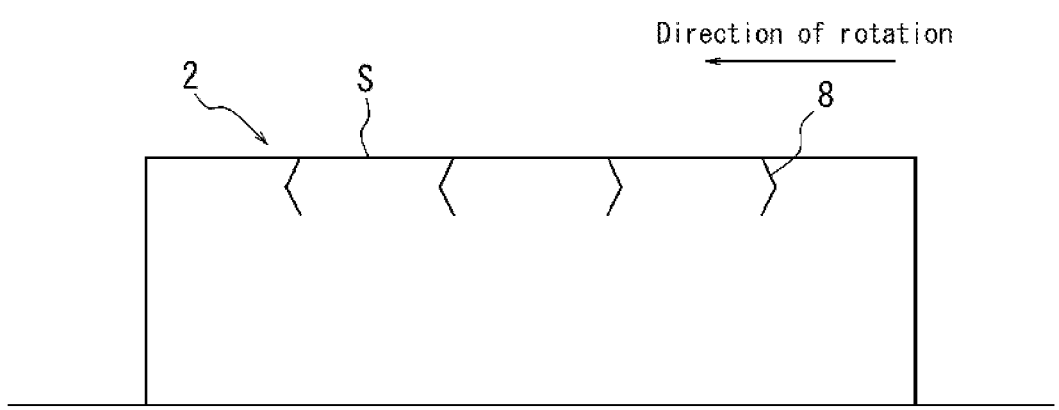
FIG. 16 is one example of an arrow sectional view of the land portion 2 illustrated in FIG. 11 taken along the line C-C in the tire circumferential direction.

FIGS. 15 and 16 are arrow sectional views of the land portion 2A taken along C-C in the tire circumferential direction or of the land portion 2B taken along B-B in the tire circumferential direction. Meanwhile, in one example of a pneumatic tire according to the present invention, the arrow sectional view taken along B-B and the arrow sectional view taken along C-C have the same pattern.

With reference to FIG. 15, a concrete description is given. When a land portion 2 is cut in the tire circumferential direction, the sipe center surface 8 in the vicinity of the land portion surface on one side in the tire circumferential direction is bent toward right in the figure (toward the other side in the tire circumferential direction), and the sipe center surface 8 on the other side in the tire circumferential direction is bent toward left in the figure (toward the one side in the tire circumferential direction). That is to say, the bent convex portions of the land portion's surface-side parts are directed toward a middle of the land portion 2 in the tire circumferential direction. Alternatively, as illustrated in FIG. 16, the bent convex portions of the land portion's surface-side parts are directed toward both ends of the land portion 2 in the tire circumferential direction.

With the above arrangement pattern, since the single land portion is provided with the sipes 5 whose land portion's surface-side parts have bent directions opposing to each other, all of snow performance, wet performance, and dry performance are ensured evenly within the single land portion.

In particular, as in FIG. 16, by configuring the bent convex portions of the land portion's surface-side parts to be directed to both the ends of the land portion in the tire circumferential direction, a small block group on an entry-exit side contributes more to various performance than a small block group on an input-entry side. In this case, on a snowy road, it becomes easier for edges on the input-exit side to penetrate into snow, and on a dry/wet road surface, lift and deformation of the input-exit side is prevented, and snow performance, wet performance, and dry performance are further improved evenly.

In the third arrangement pattern, it is preferable to arrange the land portions 2 provided with the sipes illustrated in FIGS. 15 and 16 over the entire tread portion 1.

With the above structure, in all the regions on the tread portion 1, all of snow performance, dry performance, and wet performance are ensured evenly.

EXAMPLE 1

Next, Example tires 1-6 according to the present invention, Conventional Example tire according to the conventional technology, and Comparative Example tire 1 were experimentally produced, and each tire was subjected to evaluation of snow performance, dry performance, and wet performance.

Example tire 1 is a radial tire for passenger vehicles according to the first embodiment that has a size of 195/65R15, an application rim of 6J×15, and an application internal pressure of 200 kPa and that includes the tread pattern as illustrated in FIG. 2 and a land portion with the sipe section illustrated in FIG. 3 and the sipe center surface 8 illustrated in FIG. 4. Specifications of Example tire 1 are shown in Table 1 below.

Example tire 2 is a radial tire for passenger vehicles according to the second embodiment that includes the tread pattern as illustrated in FIG. 2 and a land portion with the sipe section illustrated in FIG. 5 and the sipe center surface 8 illustrated in FIG. 6. Example tire 2 is substantially the same as Example tire 1 except for that the specifications are as shown in Table 1 below.

Example tire 3 is a radial tire for passenger vehicles that includes a land portion in which sipes are arranged such that the bent direction of the land portion's surface-side parts of the sipes 5a and 5b is opposite to the bent direction of the land portion's surface-side parts of the sipes 5c and 5d. Example tire 3 is substantially the same as Example tire 1 except for that the specifications are as shown in Table 1 below.

Example tire 4 is a radial tire for passenger vehicles that includes a land portion provided with sipes whose sipe depth at both the ends in the sipe width direction is the same as the sipe depth in the middle in the sipe width direction. Example tire 4 is substantially the same as Example tire 1 except for that the specifications are as shown in Table 1 below.

Example tire 5 is a radial tire for passenger vehicles that includes a land portion provided with a sipe having a depth H1 in the land portion's surface-side part $5a_1$ that is less than 20% of the maximum depth H of the sipe, and Example tire 6 is a radial tire for passenger vehicles that includes a land portion provided with a sipe having a depth H1 in the land surface-side part $5a_1$ that is more than 40% of the maximum depth H of the sipe. Example tire 5 and Example tire 6 are substantially the same as Example tire 1 except for that the specifications are as shown in Table 1 below.

On the other hand, as illustrated in 17A, Conventional Example tire is a radial tire for passenger vehicles that include a land portion provided with a two-dimensional sipe that has a zigzag pattern extending in the tire width direction with amplitude in the tire circumferential direction and that extends linearly in the tire radial direction.

Figure 17A:
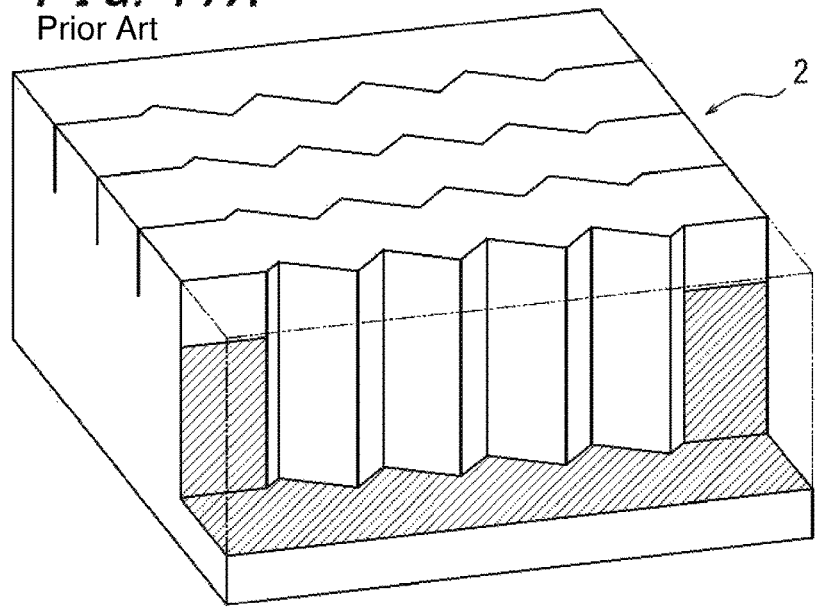
FIG. 17A is a sectional perspective view of a sipe in a Conventional Example tire.
Figure 17B:
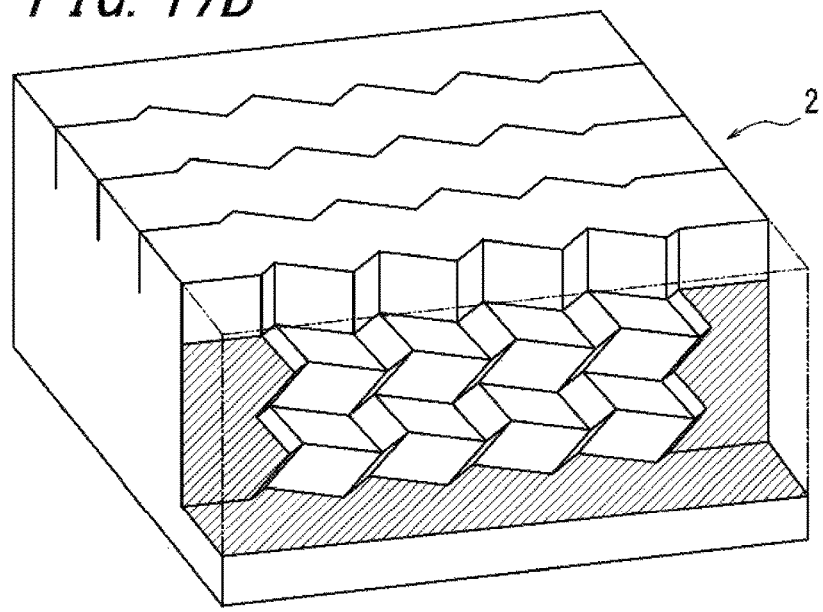
FIG. 17B is a sectional perspective view of a sipe in Comparative Example Tire 1.

As illustrated in FIG. 17B, Comparative Example tire 1 is a radial tire for passenger vehicles in which a portion of the sipe located in the depth H1 region from the land portion surface in Example tire 1 is replaced with a two-dimensional sipe that has a zigzag pattern extending in the tire width direction with amplitude in the tire circumferential direction and that extends linearly in the tire radial direction.

TABLE 1

| | | Example tire 1 | Example tire 2 | Example tire 3 | Example tire 4 | Example tire 5 | Example tire 6 | Conventional Example tire | Comparative Example tire 1 |
|---|---|---|---|---|---|---|---|---|---|
| Vicinity of land portion surface | Bent direction in depth direction | Circumferential direction | Circumferential direction | Circumferential direction | Circumferential direction | Circumferential direction | Circumferential direction | No bending | No bending |
| | Depth H1 (mm) of land portion's surface-side part $5a_1$ | 2.0 | 2.0 | 2.0 | 2.0 | 1.0 | 3.0 | — | — |
| | Displacement m (mm) of center surface Q of land portion's surface-side part $5a_1$ | 0.5 | 0.5 | 0.5 | 0.5 | 0.5 | 0.5 | — | — |
| Inner side region than vicinity of land portion surface in tire radial direction | Bent direction in depth direction | Width direction | Circumferential direction | Width direction | Width direction | Width direction | Width direction | No bending | Width direction |
| | Displacement n (mm) of center surface Q of land portion's bottom-side part $5a_2$ | 0 | 0.7 | 0 | 0 | 0 | 0 | — | — |
| Sipe depth (mm) at both ends in sipe width direction | | 2.0 | 2.0 | 2.0 | 7.0 | 7.0 | 7.0 | 2.0 | 2.0 |
| Sipe maximum depth H | | 7.0 | 7.0 | 7.0 | 7.0 | 7.0 | 7.0 | 7.0 | 7.0 |
| Number of the sipes (pieces) | | 4 | 4 | 4 | 4 | 4 | 4 | 4 | 4 |

Example tires 1-6, Conventional Example tire, Comparative Example tire 1 were each mounted to a vehicle, and various evaluation tests were performed. In the tests, measurement value of Conventional Example tire as 100 (standard), and a larger numeric value indicates superior performance.

TABLE 2

| | Example tire 1 | Example tire 2 | Example tire 3 | Example tire 4 | Example tire 5 | Example tire 6 | Conventional Example tire | Comparative Example tire 1 |
|---|---|---|---|---|---|---|---|---|
| Snow performance | 104 | 103 | 103 | 103 | 101 | 101 | 100 | 98 |
| Wet performance | 104 | 103 | 103 | 102 | 102 | 102 | 100 | 102 |
| Dry performance | 106 | 105 | 105 | 103 | 103 | 103 | 100 | 104 |

Example tires 1, 2, and 4-6 and Comparative Example tire 1 were mounted to a vehicle such that the bent directions (directions in which the bent points are located) of the sipes toward the tire circumferential direction are directed to the trailing side of the land portion.

Snow performance was evaluated by conducting a snow acceleration test in which the vehicle was parked on a snowy road, and the vehicle was transitioned from the stationary state to a full throttle state, and time (acceleration time) required for running 50 m was measured. Wet performance was evaluated by conducting a wet braking test in which the vehicle was parked on a wet road surface, and a braking distance required for the vehicle to transition from a state with an original speed of 80 km/h to the stationary full braking state was measured. Dry performance was evaluated by conducting a dry braking test in which the vehicle was parked on a dry road surface, and a braking distance required for the vehicle to transition from a state with an original speed of 100 km/h to the stationary full braking state was measured.

The results are shown in Table 2. The results show, for each performance, the values that are indexed with the measurement value of Conventional Example tire as 100 (standard), and a larger numeric value indicates superior performance.

From the results of Table. 2, it has been found that Example tires 1-6 exhibit much better results in terms of any of snow performance, wet performance, and dry performance than Conventional Example tire.

It has also been found that, compared with Comparative Example tire 1, Example tire 1 delivers better snow performance along with better wet performance and dry performance.

EXAMPLE 2

Next, Example tires 7-11 according to the present invention and Comparative Example tire 2 were experimentally produced, and each tire was subjected to evaluation of snow performance, dry performance, and wet performance.

Specifically, Example tires 7-11 each are a radial tire for passenger vehicles that has the size of 195/65R15, the application rim of 6J×15, and the application internal pressure of 200 kPa and that includes the tread pattern illustrated in FIG. 11 and the sipes according to the first embodiment as illustrated in FIGS. 3 and 4.

Figure 12B:
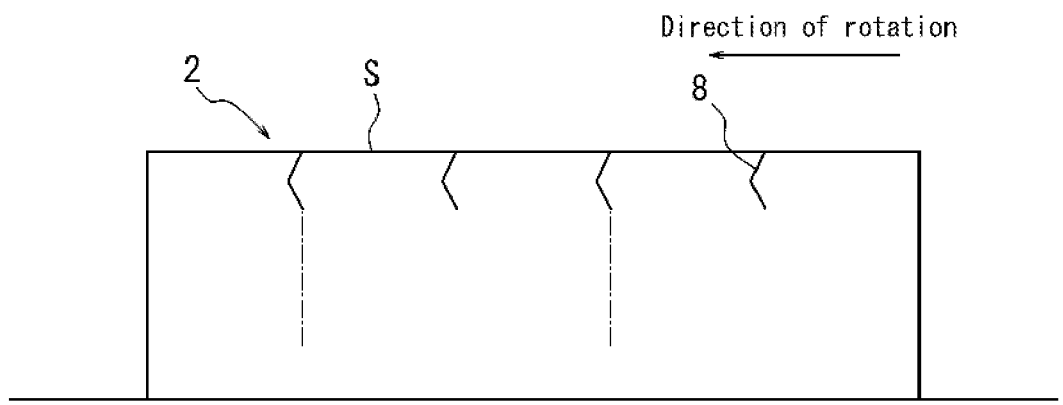
FIG. 12B is one example of an arrow sectional view of a land portion 2A illustrated in FIG. 11 taken along a line C-C in the tire circumferential direction.

Example tire 7 is a pneumatic tire in which sipes are arranged over the entire tread portion in accordance with the first arrangement pattern. Here, the sipes are arranged such that in the center-side land portions $R_C$ the land portion's surface-side parts are bent in a direction opposite to the direction of rotation of the tire, that is to say, toward the trailing side (FIG. 12A). On the other hand, the sipes are arranged such that in the shoulder-side land portions $R_S$ the land portion's surface-side parts are bent toward the direction of rotation of the tire, that is to say, toward the leading side (FIG. 12B).

The land portion's surface-side part $5a_1$ has a depth $H_1$=2.0 mm, and the sipe maximum depth H=7.0 mm, the sipe center surface in the land portion's surface-side part $5a_1$ has the displacement m=0.5 mm, and the sipe center surface in the land portion's bottom-side part $5a_2$ has the displacement n=0 mm.

Figure 13A:
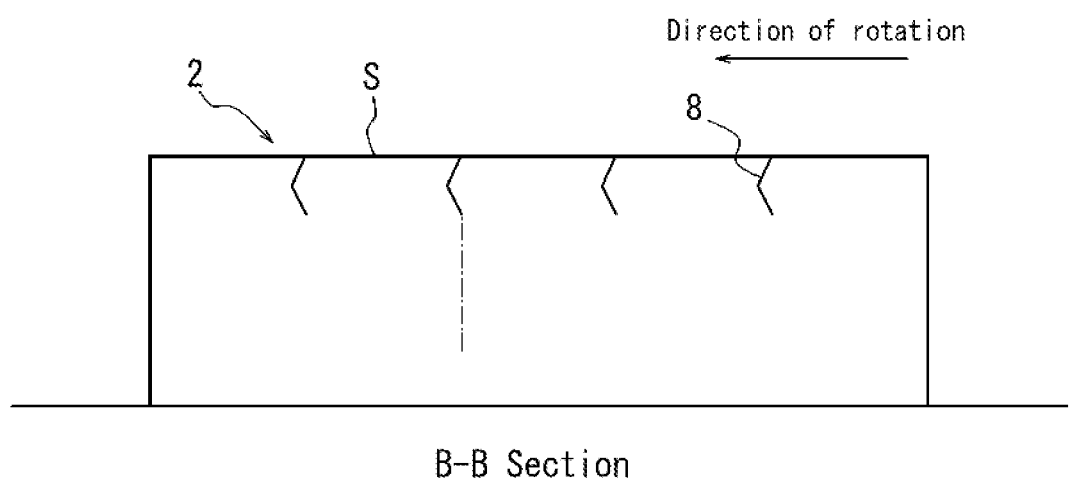
FIG. 13A is another example of an arrow sectional view of the land portion 2B illustrated in FIG. 11 taken along the line B-B in the tire circumferential direction.
Figure 13B:
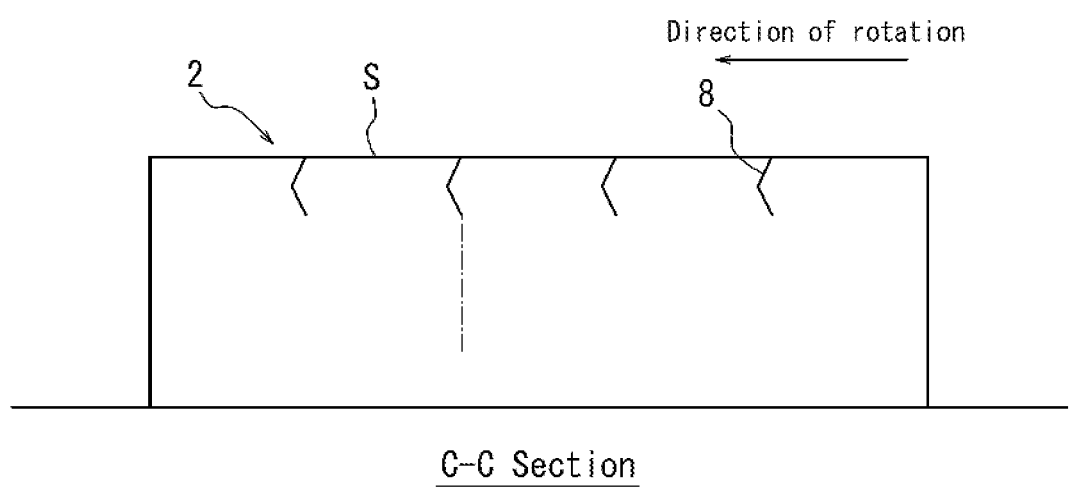
FIG. 13B is another example of an arrow sectional view of the land portion 2A illustrated in FIG. 11 taken along the line C-C in the tire circumferential direction.

Example tire 8 is a pneumatic tire in which sipes are arranged over the entire tread portion in accordance with the second arrangement pattern. Here, the sipes are arranged such that both the bent direction of the land portion's surface-side parts in the center-side land portions $R_C$ and the bent direction of the land portion's surface-side parts in the shoulder-side land portions $R_S$ are directed to the direction of rotation of the tire (FIGS. 13A and 13B). Other points of the structure of Example tire 8 are substantially the same as Example tire 7.

Figure 14A:
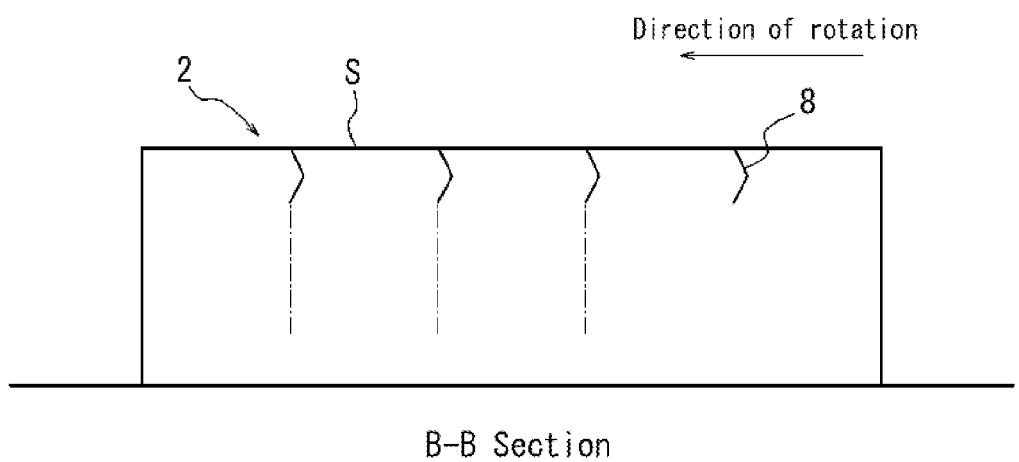
FIG. 14A is yet another example of an arrow sectional view of the land portion 2B illustrated in FIG. 11 taken along the line B-B in the tire circumferential direction.
Figure 14B:
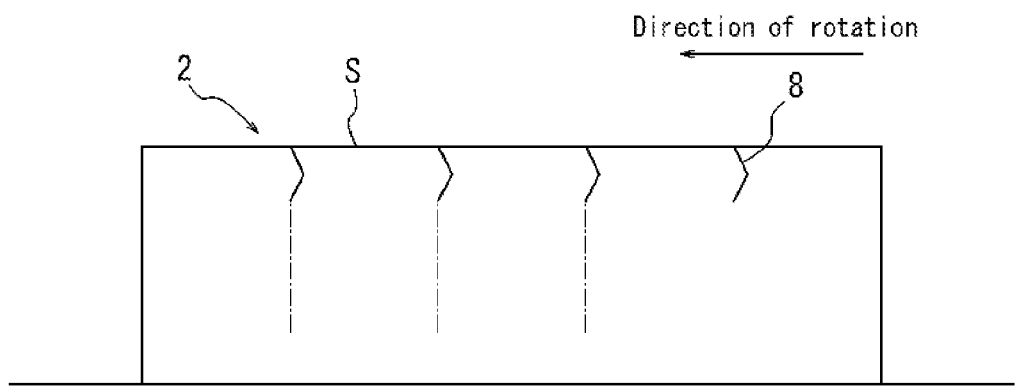
FIG. 14B is yet another example of an arrow sectional view of the land portion 2A illustrated in FIG. 11 taken along the line C-C in the tire circumferential direction.

Similarly to Example tire 8, Example tire 9 is a pneumatic tire in which sipes are arranged over the entire tread portion in accordance with the second arrangement pattern. Here, the sipes are arranged such that both the bent direction of the land portion's surface-side parts in the center-side land portions $R_C$ and the bent direction of the land portion's surface-side parts in the shoulder-side land portions $R_S$ are directed opposite to the direction of rotation of the tire (FIGS. 14A and 14B). Other points of the structure of Example tire 9 are substantially the same as Example tire 7.

Example tire 10 is a pneumatic tire in which sipes are arranged over the entire tread portion in accordance with the third arrangement pattern. Here, a plurality of sipes is arranged, for a single land portion, such that the bent direction of the land portion's surface-side part of each of the sipes is directed toward the middle of the land portion 2 (FIG. 15). Other points of the structure of Example tire 10 are substantially the same as Example tire 7.

Similarly to Example tire 10, Example tire 11 is a pneumatic tire in which the sipes are arranged over the entire tread portion in accordance with the third arrangement pattern. Here, a plurality of sipes are provided, for a single land portion, such that the bent direction of the land portion's surface-side part of each of the sipes is directed toward both the ends of the land portion 2 in the tire circumferential direction (FIG. 16). Other points of the structure of Example tire 10 are substantially the same as Example tire 7.

On the other hand, Comparative Example tire 2 is a radial tire for passenger vehicles that includes, in the center-side land portions $R_C$, conventional two-dimensional sipes illustrated in FIG. 17A each having the zigzag pattern on the tread surface of the land portion and extending linearly in the tire radial direction and that also includes, in the shoulder-side land portions $R_S$, conventional three-dimensional sipes illustrated in FIG. 17B each having the zigzag pattern on the tread surface of the land portion and, with respect to the tire radial direction, extending linearly in the vicinity of the land portion surface and being displaced in the tire width direction in the region located at a greater depth than the vicinity of the land portion surface. Other points of the structure of Comparative Example tire 2 are substantially the same as Example tires.

Example tires 7-11 and Comparative Example tire 2 were each mounted to a vehicle, and various evaluation tests were performed as in the cases of Example tires 1-6. Here, Example tires 7-9 were each mounted to a vehicle such that the bent directions of the land portion's surface-side parts toward the tire circumferential direction in each region are directed as described above with respect to the direction of rotation of the tire. The results are shown in Table 3. The results show, for each performance, the values that are indexed with the measurement value of Comparative Example tire 2 as 100 (standard), and a larger numeric value indicates superior performance.

TABLE 3

|  | Example tire 7 | Example tire 8 | Example tire 9 | Example tire 10 | Example tire 11 | Comparative Example tire 2 |
|---|---|---|---|---|---|---|
| Snow performance | 106 | 102 | 106 | 102 | 104 | 100 |
| Wet performance | 104 | 104 | 102 | 102 | 104 | 100 |
| Dry performance | 104 | 104 | 102 | 102 | 104 | 100 |

From the results of Table. 3, it has been found that Example tires 7-11 exhibit better results in terms of any of snow performance, wet performance, and dry performance than Comparative Example tire 2.

Above all, Example tire 7 has been found to remarkably improve all of snow performance, wet performance, and dry performance.

Example tire 8 has also been found to significantly improve dry performance and wet performance, in particular. Example tire 9 has also been found to significantly improve snow performance, in particular.

Example tires 10 and 11 have also been found to improve all of snow performance, wet performance, and dry performance evenly.

INDUSTRIAL APPLICABILITY

The present invention makes it possible to provide a pneumatic tire provided with a sipe in a land portion that is capable of simultaneously providing snow performance, dry performance, and wet performance all at a high level in a single land portion.

REFERENCE SIGNS LIST 1 tread portion
2 land portion 2a sub-land portion
3 circumferential groove
4 lateral groove
5 sipe
$5a_1$ land portion's surface-side part
$5a_2$ land portion's bottom-side part
6 corner portion of sub-land portion 2a
7 center region of land portion 2 in depth direction
8 sipe center surface
9 maximum amplitude position of sipe
10 vertical portion
P intersection point between center line L and sipe 5 on land portion surface S
S land portion surface
L center line of amplitude of sipe
f maximum amplitude
m displacement of land portion's surface-side part $5a_1$ in tire circumferential direction
n displacement of land portion's bottom-side part $5a_2$ in tire circumferential direction

The invention claimed is:

1. A pneumatic tire including a land portion on a tread portion, the land portion being provided with a sipe that has amplitude in a tire circumferential direction in a plan view and that extends in a tire width direction in the plan view, wherein:
   in a depth direction extending from a land portion surface toward an inner side in a tire radial direction, the sipe comprises:
   a surface-side part of the land portion that is bent toward the tire circumferential direction from the land portion surface, the surface-side part of the land portion extending from a first widthwise end surface of the land portion to a second widthwise end surface of the land portion opposite from the first widthwise end surface of the land portion along the tire width direction; and
   a bottom-side part of the land portion that is bent toward the tire circumferential direction
   the following condition is satisfied : n>m,
   where a first bent shape of the surface-side part of the sipe defines a first displacement m, and a second bent shape of the bottom-side part of the sipe defines a second displacement n, and
   the first bent shape of the surface-side part of the sipe and the second bent shape of the bottom-side part of the sipe extend in the tire circumferential direction from the same tire circumferential position.

2. The pneumatic tire according to claim 1, wherein the sipe has a smaller depth at both ends thereof in a sipe width direction than in a middle thereof in the sipe width direction.

3. The pneumatic tire according to claim 1, wherein a depth of the surface-side part of the land portion is 20-40% of a maximum depth of the sipe.

4. The pneumatic tire according to claim 1, wherein the surface-side part of the land portion includes a single bent point.

5. The pneumatic tire according to claim 1, wherein the land portion is divided into a plurality of rib-shaped land portions by a circumferential groove and/or divided into a plurality of block-shaped land portions by a circumferential groove and a lateral groove intersecting the circumferential groove,
the sipe comprises a plurality of sipes provided in each of the plurality of land portions, and
the respective surface-side parts of the plurality of sipes are all bent in a same direction toward the tire circumferential direction within the corresponding single land portion continuously extending in the tire circumferential direction and within the corresponding single row of land portions arranged in a line in the tire circumferential direction.

6. The pneumatic tire according to claim 5, wherein the bent direction of the surface-side parts of the land portion of the sipes provided in a shoulder-side land portion located close to a tread end is different from the bent direction of the surface-side parts of the sipes provided in a center-side land portion located closer to a tire equator than the shoulder-side land portion.

7. The pneumatic tire according to claim 5, wherein the bent direction of the surface-side parts of the sipes provided in a shoulder-side land portion located closer to a tread end is the same as the bent direction of the surface-side parts of the sipes provided in a center-side land portion located closer to a tire equator than the shoulder-side land portion.

8. The pneumatic tire according to claim 1, wherein the land portion is divided into a plurality of block-shaped land portions by a circumferential groove and a lateral groove intersecting the circumferential groove,
the sipe comprises a plurality of sipes provided in each of the plurality of land portions, and
the respective surface-side parts of the plurality of sipes are bent in opposite directions toward the tire circumferential direction in a region closer to one side of the corresponding single land portion in the tire circumferential direction and in a region closer to the other side of the corresponding single land portion in the tire circumferential direction.

9. The pneumatic tire according to claim 8, wherein the land portions provided with the sipes are arranged over the entire tread portion.

10. The pneumatic tire according to claim 1, wherein the sipe forms a v-shape on the first and the second widthwise end surfaces of the land portion.

11. The pneumatic tire according to claim 1, wherein the sipe has a pattern in the plan view,
   wherein, in the surface-side part of the land portion, the sipe is displaced from a first position toward one side in the tire circumferential direction while maintaining the pattern in the plan view and subsequently returns to the first position in the tire circumferential direction, and
   wherein, in the bottom-side part of the land portion, the sipe is displaced from a second position toward one side in the tire width direction while maintaining the pattern in the plan view and subsequently returns to the second position in the tire width direction.

* * * * *